United States Patent
Hirai et al.

(10) Patent No.: US 11,577,823 B2
(45) Date of Patent: Feb. 14, 2023

(54) NOISE REDUCTION APPARATUS, AIRCRAFT, AND NOISE REDUCTION METHOD

(71) Applicant: JAPAN AEROSPACE EXPLORATION AGENCY, Tokyo (JP)

(72) Inventors: Tohru Hirai, Tokyo (JP); Mitsuhiro Murayama, Tokyo (JP); Kazuomi Yamamoto, Tokyo (JP); Yasushi Ito, Tokyo (JP); Kentaro Tanaka, Tokyo (JP); Takehisa Takaishi, Tokyo (JP); Yuzuru Yokokawa, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 84 days.

(21) Appl. No.: 16/976,020

(22) PCT Filed: Jan. 23, 2019

(86) PCT No.: PCT/JP2019/002065
§ 371 (c)(1),
(2) Date: Aug. 26, 2020

(87) PCT Pub. No.: WO2019/163379
PCT Pub. Date: Aug. 29, 2019

(65) Prior Publication Data
US 2021/0039773 A1 Feb. 11, 2021

(30) Foreign Application Priority Data
Feb. 26, 2018 (JP) .............................. JP2018-031578

(51) Int. Cl.
*B64C 7/00* (2006.01)
*B64C 25/00* (2006.01)
*B64C 25/34* (2006.01)

(52) U.S. Cl.
CPC .............. *B64C 25/001* (2013.01); *B64C 7/00* (2013.01); *B64C 25/34* (2013.01);
(Continued)

(58) Field of Classification Search
CPC ......... B64C 7/00; B64C 25/34; B64C 25/001; B64C 2230/14; B64C 2025/003
See application file for complete search history.

(56) References Cited

U.S. PATENT DOCUMENTS

2006/0102775 A1* 5/2006 Chow ....................... B64C 7/00
244/1 N
2008/0142634 A1* 6/2008 Moe ........................ B64C 25/34
137/224

(Continued)

FOREIGN PATENT DOCUMENTS

EP    1556275 A1    7/2005
EP    2415670 A1    2/2012

(Continued)

OTHER PUBLICATIONS

International Search Report in International Application No. PCT/JP2019/002065, filed Jan. 23, 2019.

(Continued)

*Primary Examiner* — Tye William Abell
(74) *Attorney, Agent, or Firm* — Saliwanchik, Lloyd & Eisenschenk

(57) ABSTRACT

A noise reduction apparatus, an aircraft, and a noise reduction method capable of increasing the amount of noise reduction are provided. The noise reduction apparatus 1 includes a porous plate 2 disposed to face a fluid flow, the porous plate 2 including a bend region 5 bent toward an upstream side of the fluid flow. The bend region 5 is provided at the end portion 6 of the porous plate 2, and has a concave R-shape on an upstream side of the fluid flow.

10 Claims, 28 Drawing Sheets

(52) U.S. Cl.
CPC .... *B64C 2025/003* (2013.01); *B64C 2230/08* (2013.01); *B64C 2230/14* (2013.01)

(56) References Cited

U.S. PATENT DOCUMENTS

| | | | | |
|---|---|---|---|---|
| 2010/0108805 | A1* | 5/2010 | Piet | B64C 25/16 |
| | | | | 244/1 N |
| 2012/0043418 | A1* | 2/2012 | Isotani | B64C 25/001 |
| | | | | 244/102 R |
| 2014/0054105 | A1* | 2/2014 | Glav | B60R 13/0838 |
| | | | | 181/204 |
| 2015/0083857 | A1* | 3/2015 | Simonneaux | B64C 25/32 |
| | | | | 244/102 R |
| 2016/0031549 | A1* | 2/2016 | Patience | B64C 21/02 |
| | | | | 181/286 |

FOREIGN PATENT DOCUMENTS

| | | |
|---|---|---|
| EP | 2450274 A2 | 5/2012 |
| GB | 2494219 A | 3/2013 |
| JP | 2003-219506 A | 7/2003 |
| JP | 2010-522110 A | 7/2010 |
| JP | 2014-514502 A | 6/2014 |
| WO | WO-2004/039671 A1 | 5/2004 |
| WO | WO-2012/150896 A1 | 11/2012 |

OTHER PUBLICATIONS

Office Action dated Aug. 27, 2019 in Japanese Application No. 2018-031578, along with its English translation.
Herkes, B., "The Quiet Technology Demonstrator 2 Flight Test," *The Aviation Noise & Air Quality Symposium*, Mar. 7, 2006, pp. 1-32.
Li, Y. et al., "Measurement and control of aircraft landing gear broadband noise," *Aerospace Science and Technology*, 2012, 23:213-223, 2011 Elsevier Masson SAS.
Yamamoto, K. et al., "FQUROH: A Flight Demonstration Project for Airframe Noise Reduction Technology—the 1st Flight Demonstration," *23rd AIAA/CEAS Aeronautics Conference*, Jun. 5-9, 2017, American Institute of Aeronautics and Astronautics, Inc.
Herkes, W. H. et al., "The Quiet Technology Demonstrator Program: Flight Validation of Airplane Noise-Reduction Concepts," *12th AIAA/CEAS Aeroacoustics Conference (27th AIAA Aeroacoustics Conference)*, May 8-10, 2006, American Institute of Aeronautics and Astronautics, Inc.
Supplementary European Search Report dated Mar. 29, 2021 in European Application No. 19756790.2.

* cited by examiner (1)

(2)

(3)

NOISE REDUCTION APPARATUS, AIRCRAFT, AND NOISE REDUCTION METHOD

CROSS-REFERENCE TO RELATED APPLICATIONS

This application is the U.S. national stage application of International Patent Application No. PCT/JP2019/002065, filed Jan. 23, 2019, which claims the benefit under 35 U.S.C. § 119 of Japanese Application No. 2018-031578, filed Feb. 26, 2018, the disclosures of each of which are incorporated herein by reference in their entirety.

TECHNICAL FIELD

The present invention relates to a noise reduction apparatus and a noise reduction method, for example, for use in reducing the noise of an aircraft, and further relates to an aircraft equipped with such an apparatus.

BACKGROUND ART

As a technique for reducing a noise of an aircraft, for example, it is known to dispose a solid fairing or a porous plate in front of a main landing gear inter-wheel section (see Non-Patent Literatures 1 to 3 and Patent Literature 1). By disposing a solid fairing or a porous plate in front of an object, the flow velocity is reduced by suppressing the inflow of air to its downstream, and turbulence of the airflow is suppressed. This reduces the noise generated mainly around downstream objects.

CITATION LIST

Patent Literature

Patent Literature 1: WO 2004/039671

Non-Patent Literature

Non-Patent Literature 1: Herkes, B "The Quiet Technology Demonstrator 2 Flight Test," Airplanes The Aviation Noise & Air Quality Symposium, 2007

Non-Patent Literature 2: Li, Y. et. al. "Measurement and Control of Aircraft Landing Gear Broadband Noise," Aerospace Science and Technology, 2011

Non-Patent Literature 3: Yamamoto, K., et al. "FQUROH: A Flight Demonstration Project for Airframe Noise Reduction Technology—the 1st Flight Demonstration," AIAA 2017-4029, 2017.

DISCLOSURE OF INVENTION

Technical Problem

The present inventors have found that a shear layer of the airflow is generated behind the end of the solid fairing or porous plate, which causes the generation of noise and the reduction of the amount of reduction of noise. In addition, it is conceivable to bend the end portions of the solid fairing and the porous plate backward, or to curve the entire body convex forward, but the present inventors have also found that it is not possible to suppress a reduction in the amount of noise reduction.

In view of the above circumstances, an object of the present invention is to provide a noise reduction apparatus, an aircraft, and a noise reduction method capable of increasing the amount of noise reduction.

Solution to Problem

In order to achieve the above object, a noise reduction apparatus according to an embodiment of the present invention includes a porous plate disposed to face a fluid flow, the porous plate including a bend region bent toward an upstream side of the fluid flow.

It is preferable that the bend region is provided at an end portion of the porous plate. Further, it is preferable that the bend region has a concave shape on an upstream side of the fluid flow, for example, a concave R-shape.

The direction of fluid flow is typically deflected outward from the center of the porous plate due to the porous plate, but by having a bend region, the deflected fluid is easily passed through the porous plate. Thus, the shear layer of the fluid flow is weakened, the noise induced by the vortex is reduced, and it is possible to increase the reduction amount of noise.

The present invention is typically applicable to parts of an aircraft. More specifically, according to the present invention, the porous plate may be disposed to cover a front side of a main landing gear inter-wheel section or a nose landing gear inter-wheel section of an aircraft. The porous plate may be disposed to cover a front side of a structural member of a landing gear such as a main landing gear or a nose landing gear of an aircraft, for example, a side brace of a main landing gear. Alternatively, the porous plate may be disposed along a front edge of a landing gear bay of an aircraft, and the bend region may be provided on a distal end side.

Here, the porous plate typically includes holes formed of a large number of through holes or through grooves, or may be formed of a porous material.

An aircraft according to an embodiment of the present invention includes a porous plate disposed to cover a front side of a main landing gear inter-wheel section such as a main landing gear or a nose landing gear, disposed to cover a front side of a structural member of a landing gear, for example, a side brace of the main landing gear, or disposed along a front edge of a landing gear bay, the porous plate including an end portion bent forward.

A noise reduction method according to an embodiment of the present invention includes: disposing a porous plate on an upstream side of an object, which is disposed in a fluid flow and induces a noise generated by the fluid flow, to face the fluid flow; and bending at least a part of a region of the porous plate toward an upstream side of the fluid flow, a direction of the fluid flow being deflected due to the porous plate. Here, it is preferable that an end portion of the porous plate is bent toward the upstream side of the fluid flow.

Advantageous Effects of Invention

According to the present invention, the amount of noise reduction may be increased.

MODE(S) FOR CARRYING OUT THE INVENTION

Hereinafter, an embodiment of the present invention will be described with reference to the drawings.

Figure 1:
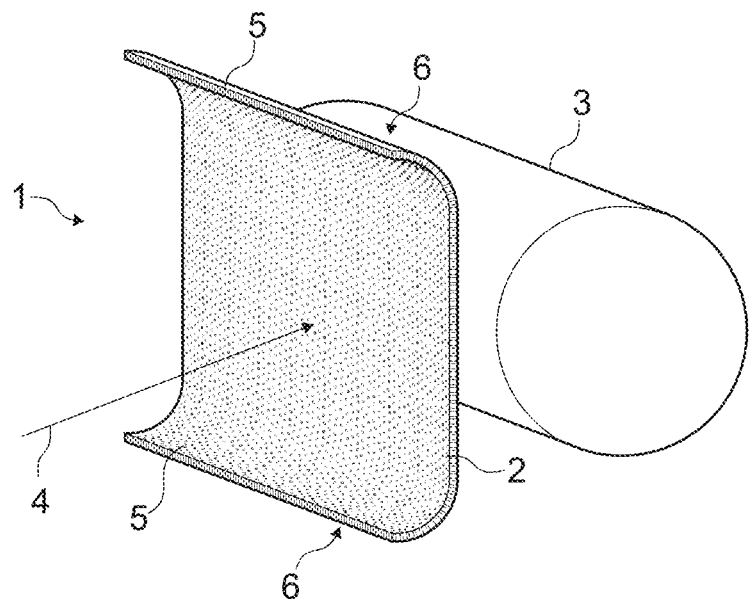
FIG. 1 A perspective view showing a noise reduction apparatus according to an embodiment of the present invention.

FIG. 1 is a perspective view showing a noise reduction apparatus according to an embodiment of the present invention.

As shown in FIG. 1, the noise reduction apparatus 1 includes a porous plate 2. The porous plate 2 typically includes holes formed of a plurality of through holes or through grooves, or may be formed of a porous material such as sponge. For example, a punching metal may be used as the porous plate 2. The holes are typically provided in the entire area of the plate, but are not necessarily provided in the entire area of the plate, and may be provided at least in a bent area described later.

The porous plate 2 is disposed on the upstream side of the object 3 at a predetermined distance from the object 3 or in contact with the object 3 to cover the object 3.

The object 3 is disposed in a fluid flow, typically air, which induces a noise generated by the fluid flow. Here, the shape of the object 3 is a cylinder, but the shape is not limited.

The porous plate 2 is typically disposed orthogonal to, i.e., opposite to, the direction 4 of the fluid flow. However, the porous plate according to the present invention does not necessarily define to be strictly orthogonal. The direction 4 of the fluid flow here refers to a direction in a state in which the direction is not deflected by the influence of the porous plate 2 and the object 3. Taking an aircraft as an example, the direction of flight of the aircraft is approximately opposite to the direction 4 of the fluid flow. However, since the airflow is locally bent depending on the shape, the direction opposite to the flight direction of the aircraft does not necessarily become the direction 4 of the fluid flow.

The porous plate 2 has bend regions 5 at the end portions 6 of the porous plate 2 which bend toward the upstream of the fluid flow, i.e., opposite to the direction 4. The bend regions 5 are formed, for example, by bending the end portions 6 of the porous plate 2 forward. The bend region 5 typically has a concave R-shape on the upstream side of the fluid flow. The radius of curvature of the R-shape is preferably determined in accordance with the degree of deflection of the fluid, which will be described later.

Here, although the bend regions 5 are provided at the end portions 6, at least a part of the region of the porous plate 2, in which the direction of the fluid flow is deflected due to the porous plate 2, may be bent toward the upstream side of the fluid flow.

Figure 2:
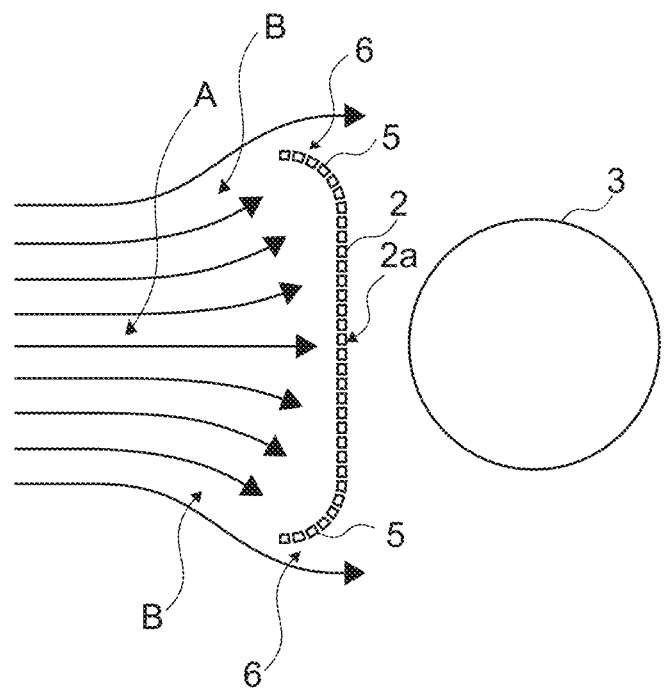
FIG. 2 A diagram for explaining the operation of the noise reduction apparatus shown in FIG. 1.

As shown in FIG. 2, the direction of the fluid flow due to the porous plate 2 present in the fluid flow is deflected outward from the center 2a of the porous plate 2. The present inventors have found that, thus, the shear layer of the airflow occurs behind the end of the solid fairing or porous plate, which causes the generation of noise and the decrease of the amount of reduction of noise.

In this case, for example, although it is also conceivable that the end portion of the solid fairing or porous plate is bent backward or the entire surface is curved forward to be a convex curved surface, it is not possible to suppress the reduction of the noise amount. On the other hand, in the present invention, by providing the bend regions 5 at the end portions 6, the deflected fluid may easily pass through the porous plate 2. Thus, the velocity difference between the flow "A" passing through the end portions 6 and the flow "B" outside the end portions 6 is reduced, the shear layer itself of the fluid flow between them is weakened and the fluctuation of the shear layer is weakened, and the vortex generated by the shear layer is weakened or no vortex is generated. Since the fluid fluctuation is reduced because the vortex is weakened or a vortex is not generated, the noise is reduced, and it is possible to increase the reduction amount of noise.

The simulation results performed to confirm the noise reduction effect of the noise reduction apparatus 1 according to the present embodiment are shown. FIGS. 3A to 3D, FIG. 4, and FIG. 5 are evaluated by numerical analysis on a simple-cylinder problem. Incidentally, in the cross-sectional flow velocity distribution in the drawings below, the denser gray scale indicates that the flow velocity is faster. In addition, in the cross-sectional pressure fluctuation distribution in the drawings below, the denser gray scale indicates that the pressure fluctuation is larger.

Figure 3A:
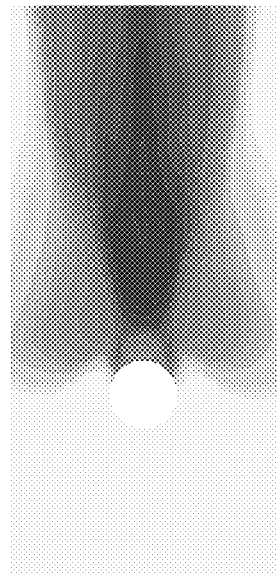
FIG. 3 A Numerical analysis results of the cross-sectional flow velocity distribution, the in-plane streamline, and the cross-sectional pressure fluctuation distribution when a cylindrical object is disposed as it is in a fluid flow.
FIG. 3B Numerical analysis results of the cross-sectional flow velocity distribution, the in-plane streamline, and the cross-sectional pressure fluctuation distribution when a flat porous plate is disposed in front of an object.
FIG. 3C Numerical analysis results of the cross-sectional flow velocity distribution, the in-plane streamline, and the cross-sectional pressure fluctuation distribution when a porous plate bent backward at the end portions is disposed in front of the object.
FIG. 3D Numerical analysis results of the cross-sectional flow velocity distribution, the in-plane streamline, and the cross-sectional pressure-fluctuation distribution when a porous plate bent forward at the end portions is disposed in front of the object.
Figure 3A:
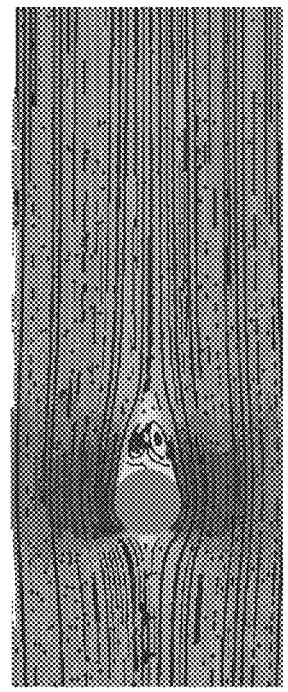
Figure 3A:
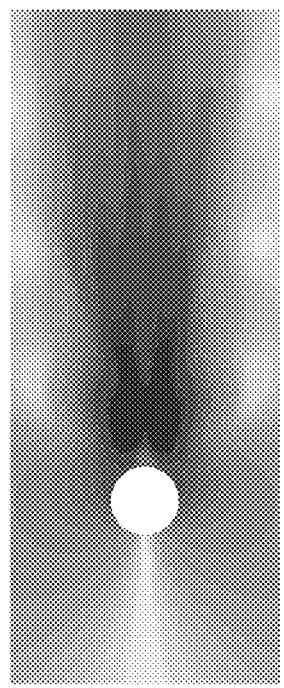
Figure 3A:
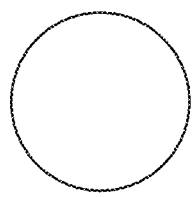

FIG. 3A shows the cross-sectional flow velocity distribution and the in-plane streamline (FIG. 3A (1)), the cross-sectional pressure fluctuation distribution (177 Hz to 354 Hz) (FIG. 3A (2)), and the cross-sectional pressure fluctuation distribution (707 Hz to 1414 Hz) (FIG. 3A (3)) when the cylindrical object 3 is disposed in the fluid flow from left to right in the drawings.

Figure 3B:
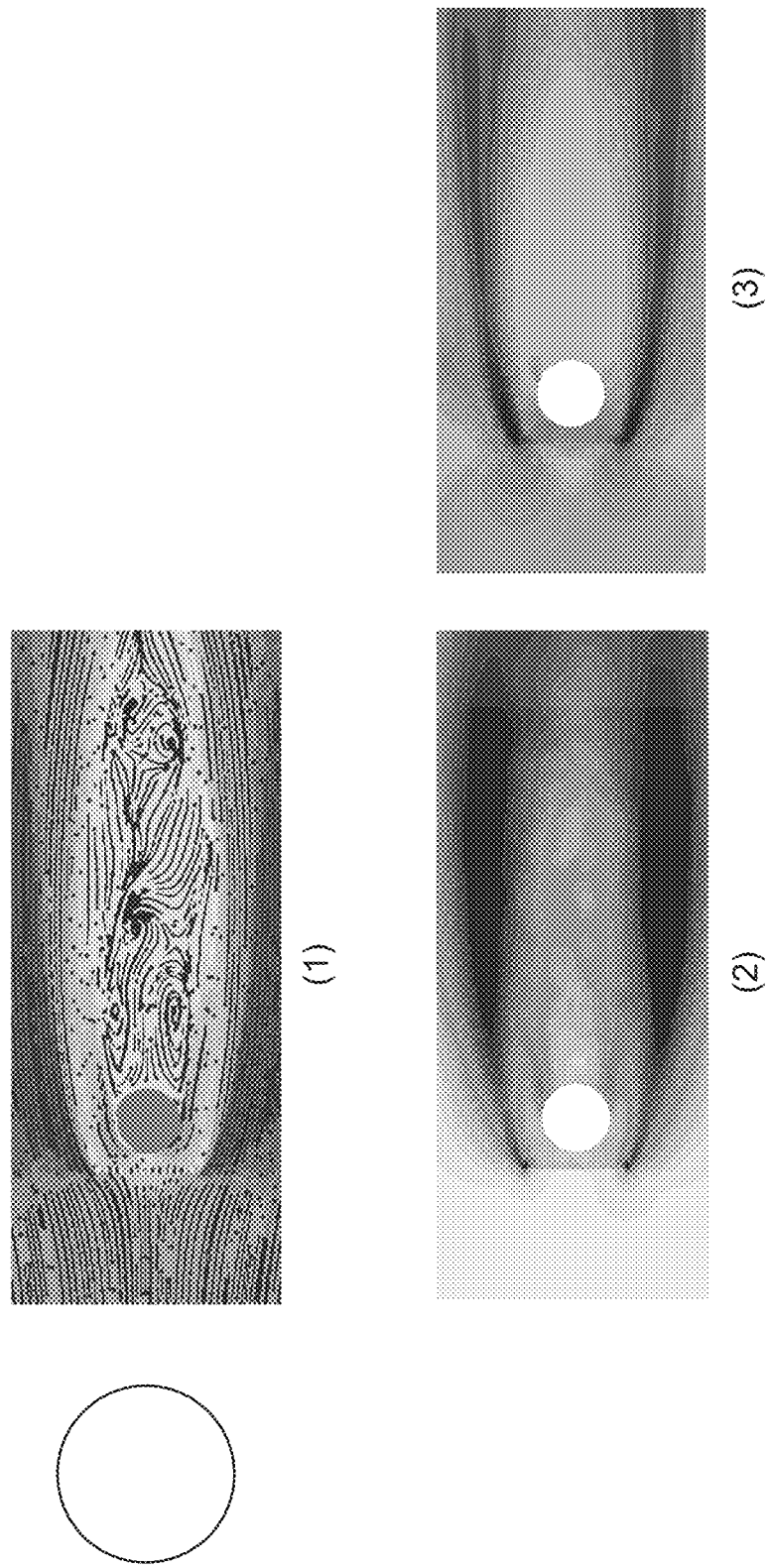

FIG. 3B shows the cross-sectional flow velocity distribution and the in-plane streamline (FIG. 3B (1)), the cross-sectional pressure fluctuation distribution (177 Hz to 354 Hz) (FIG. 3B (2)), and the cross-sectional pressure fluctuation distribution (707 Hz to 1414 Hz) (FIG. 3B (3)) when a flat porous plate is disposed in front of the object 3.

Figure 3C:
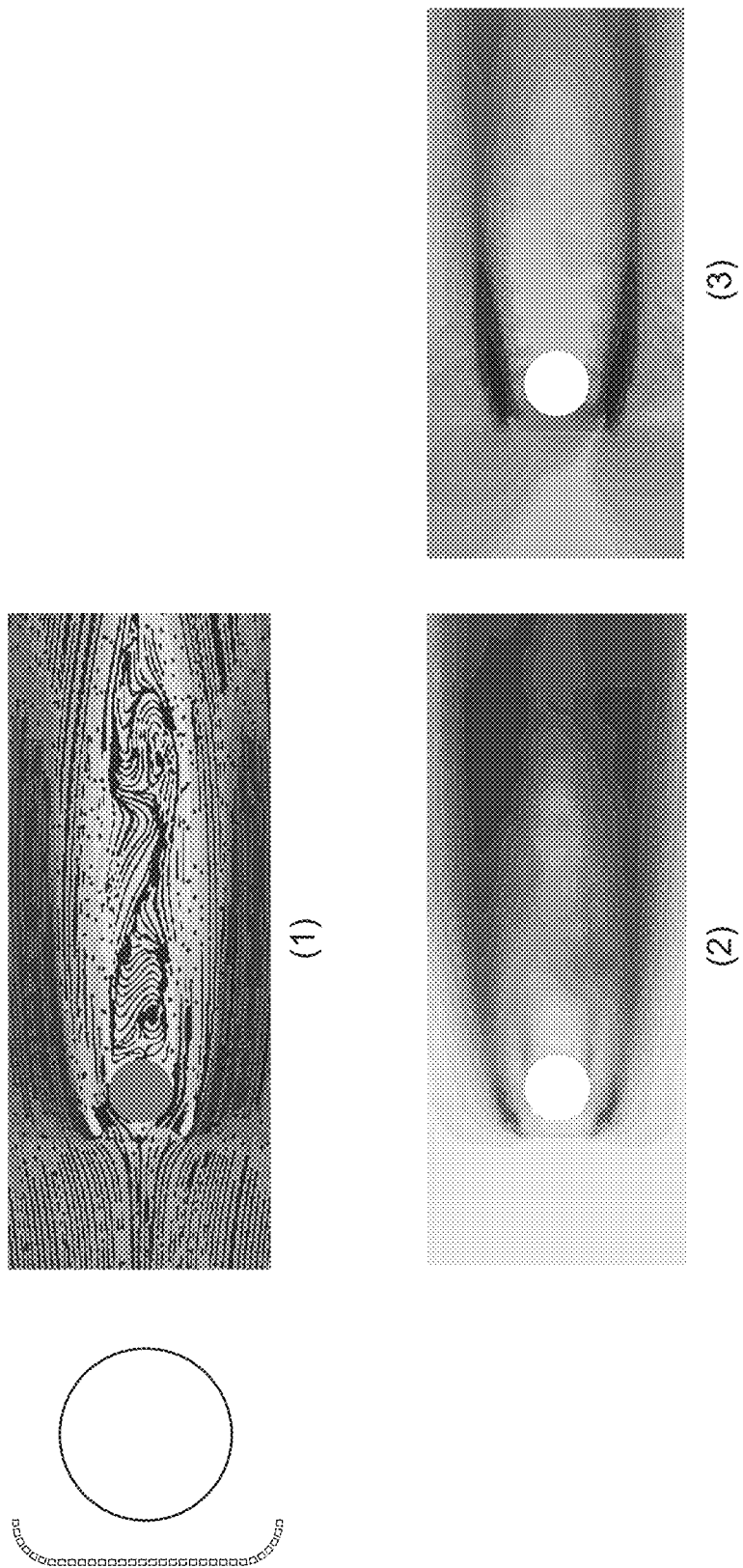

FIG. 3C shows the cross-sectional flow velocity distribution, the in-plane streamline (FIG. 3C (1)), the cross-sectional pressure fluctuation distribution (177 Hz to 354 Hz) (FIG. 3C (2)), and the cross-sectional pressure fluctuation distribution (707 Hz to 1414 Hz) (FIG. 3C (3)) when a porous plate bent backward at the end portions is disposed in front of the object 3.

Figure 3D:
Figure 3D:
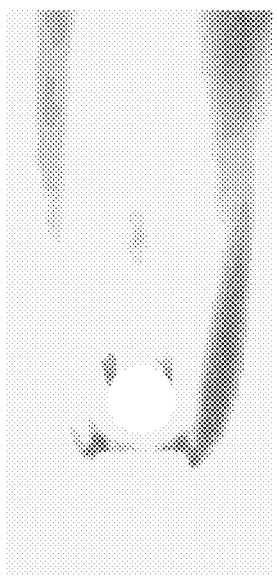
Figure 3D:
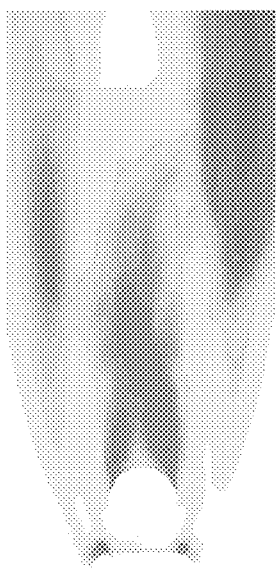
Figure 3D:
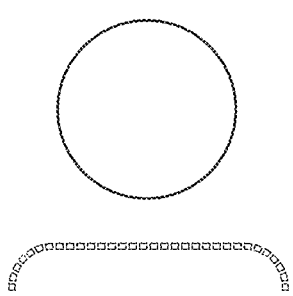

FIG. 3D shows the cross-sectional flow velocity distribution, the in-plane streamline (FIG. 3D (1)), the cross-sectional pressure fluctuation distribution (177 Hz to 354 Hz) (FIG. 3D (2)), and the cross-sectional pressure fluctuation distribution (707 Hz to 1414 Hz) (FIG. 3D (3)) when a porous plate (a porous plate according to the present embodiment) bent forward at the end portions is disposed in front of the object 3.

When there is no porous plate in front as shown in FIG. 3A (1), it is understood that the velocity around the object is increased. As shown in FIG. 3B (1) to 3D (1), the presence of a porous plate front slows down the velocity around the object.

Comparing FIGS. 3B (1) and 3C (1) with 3D (1), it is understood that the velocity gradient of the shear layer behind the end portion of the porous plate is smaller in FIG. 3D (1). Comparing FIG. 3D (2)-(3) with FIGS. 3A (2)-(3) to 3C (2)-(3), it is understood that the use of the porous plate according to the present embodiment drastically reduces the region behind the end portion of the porous plate where the fluctuation in pressure is large.

Figure 4:
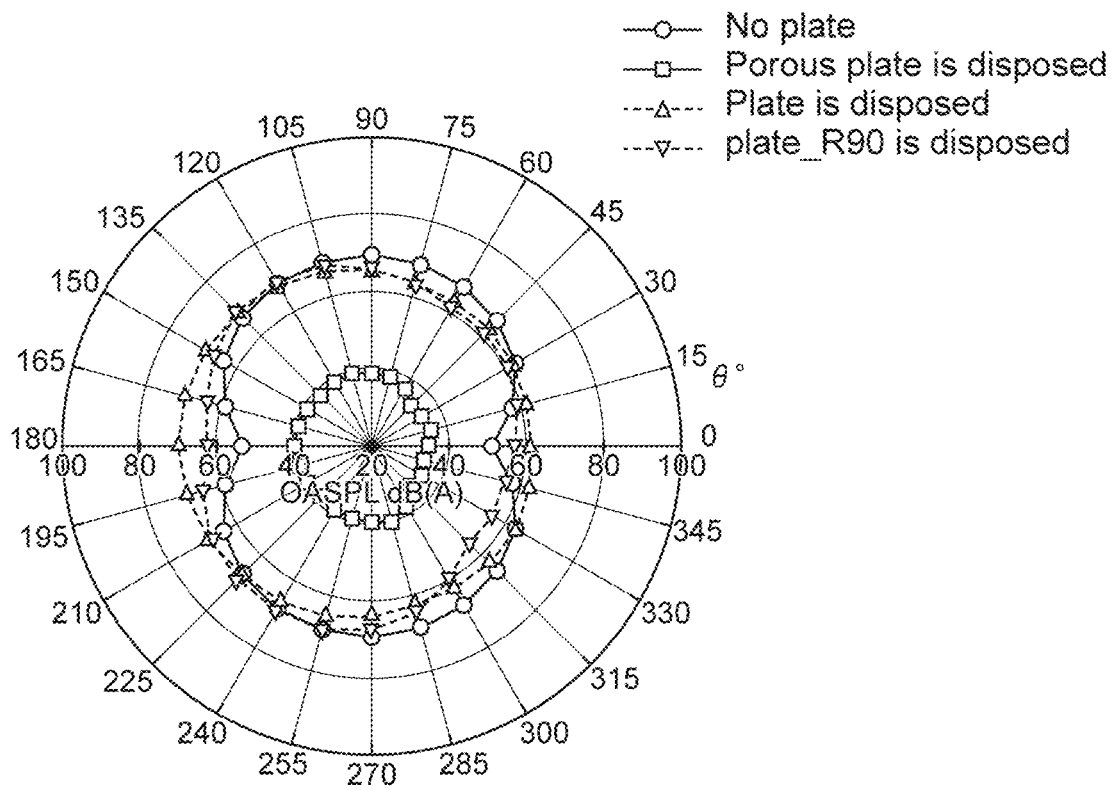
FIG. 4 A numerical analysis result of the noise level around the object when the noise reduction apparatus shown in FIG. 1 is applied.

FIG. 4 shows the noise level (OASPL) synthesized by adding the A-weighted audibility compensation around the object 3 (0° to 360°) to the sum of the levels for each frequency band from 21 Hz to 10.7 kHz. Fluid flows from 180° to 0° in the graph. Comparing the case where the porous plate (porous plate according to the present embodiment) bent forward at the end portions is disposed in front of the object 3 with the case where the cylindrical object 3 is disposed as it is in the fluid flow (without plate), it is understood that the noise level of the case where the porous plate according to the present embodiment is disposed lower over the entire direction.

Figure 5:
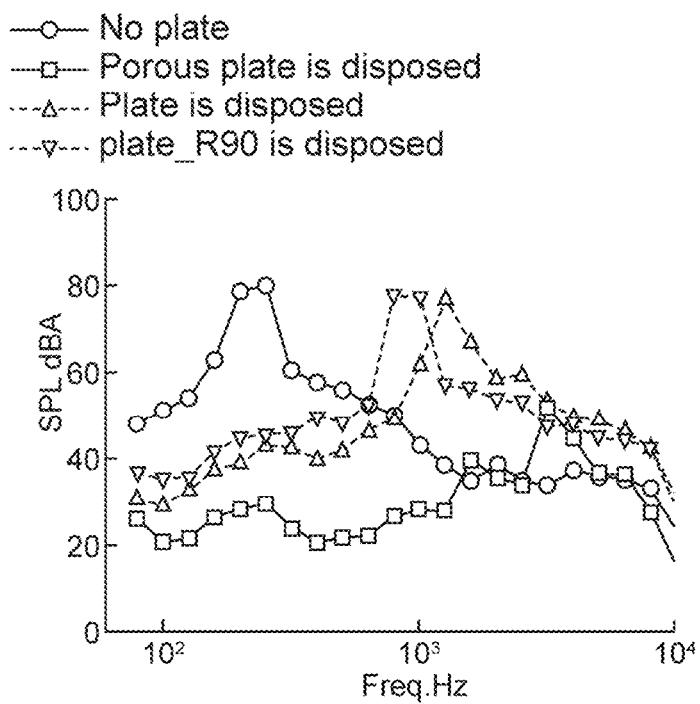
FIG. 5 A numerical analysis result of the frequency distribution of the noise when the noise reduction apparatus shown in FIG. 1 is applied.

FIG. 5 shows the frequency distribution of noise at the 270° position. FIG. 5 shows the case where the cylindrical object 3 is disposed as it is in the fluid flow (1), the case where a flat plate is disposed in front of the object 3 (2), the case where a flat porous plate is disposed in front of the object 3 (3), the case where a porous plate bent backward at the end portions is disposed in front of the object 3 (4), and the case where a porous plate bent forward at the end portions (porous plate according to the present embodiment) is disposed in front of the object 3 (5). It is understood that the noise level with the porous plate according to the present embodiment is low over a wide band.

From the above results, it is obvious that the noise reduction amount may be increased by the noise reduction apparatus 1 according to the present embodiment.

Next, embodiments will be described by applying the present invention to each part of an aircraft. The present invention is applicable to objects other than aircraft.

Figure 6:
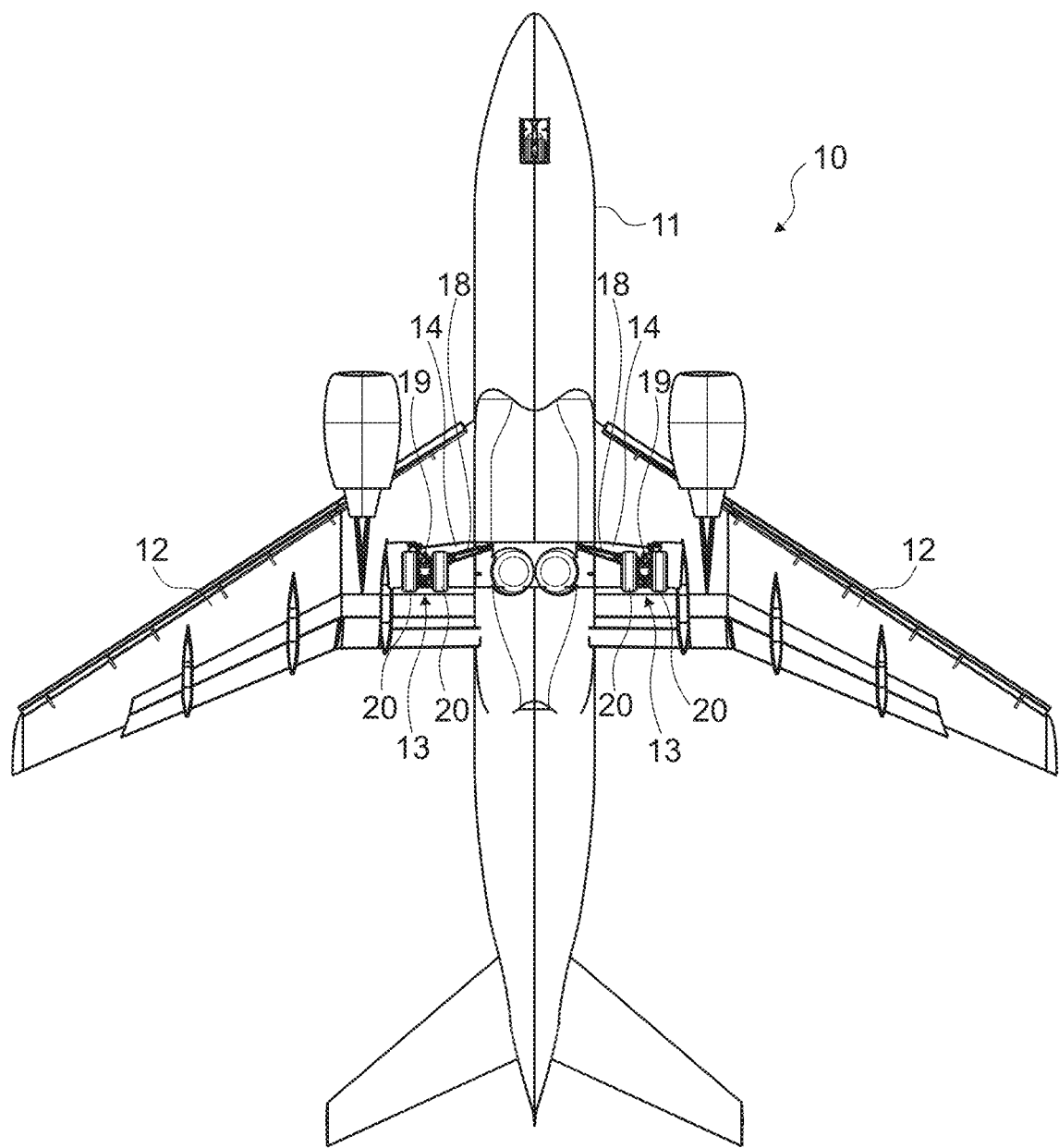
FIG. 6 A bottom view showing an aircraft seen from below, to which the noise reduction apparatus according to the present invention is applied.
Figure 7:
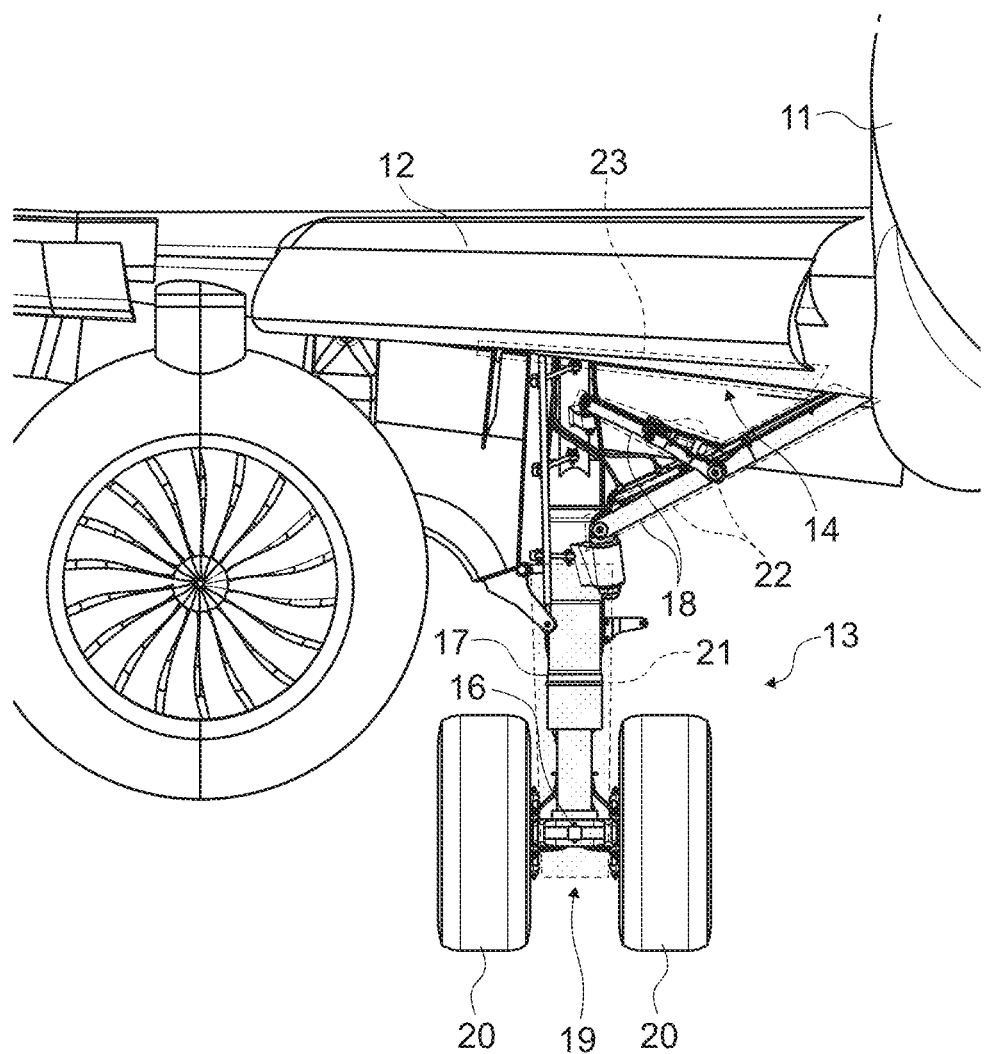
FIG. 7 A partial front view of FIG. 6.

FIG. 6 is a bottom view of the aircraft seen from below, and FIG. 7 is a partial front view.

As shown in FIG. 6, in the aircraft 10, a pair of main landing gears 13 are disposed so as to straddle the fuselage 11 and the left and right main wings 12, respectively. The main landing gear 13 is to be retracted in a landing gear bay 14. Each main landing gear 13 has two tires 20, an axle 16 between them, a landing gear strut 17 supporting the axle 16, and a side brace (lateral support) 18. The region including the axle 16 and landing gear strut 17 is referred to as the main landing gear inter-wheel section 19.

In the aircraft 10, as shown in FIG. 7, the main landing gear inter-wheel sections 19, the side brace 18, and the landing gear bay 14 employ the porous plates 21, 22, and 23 according to the present invention. Of course, a porous plate according to the present invention may be employed at another site other than these. In addition, the porous plate according to the present invention may be employed in at least one of the main landing gear inter-wheel section 19, the side brace 16, and the landing gear bay 14.

Figure 8:
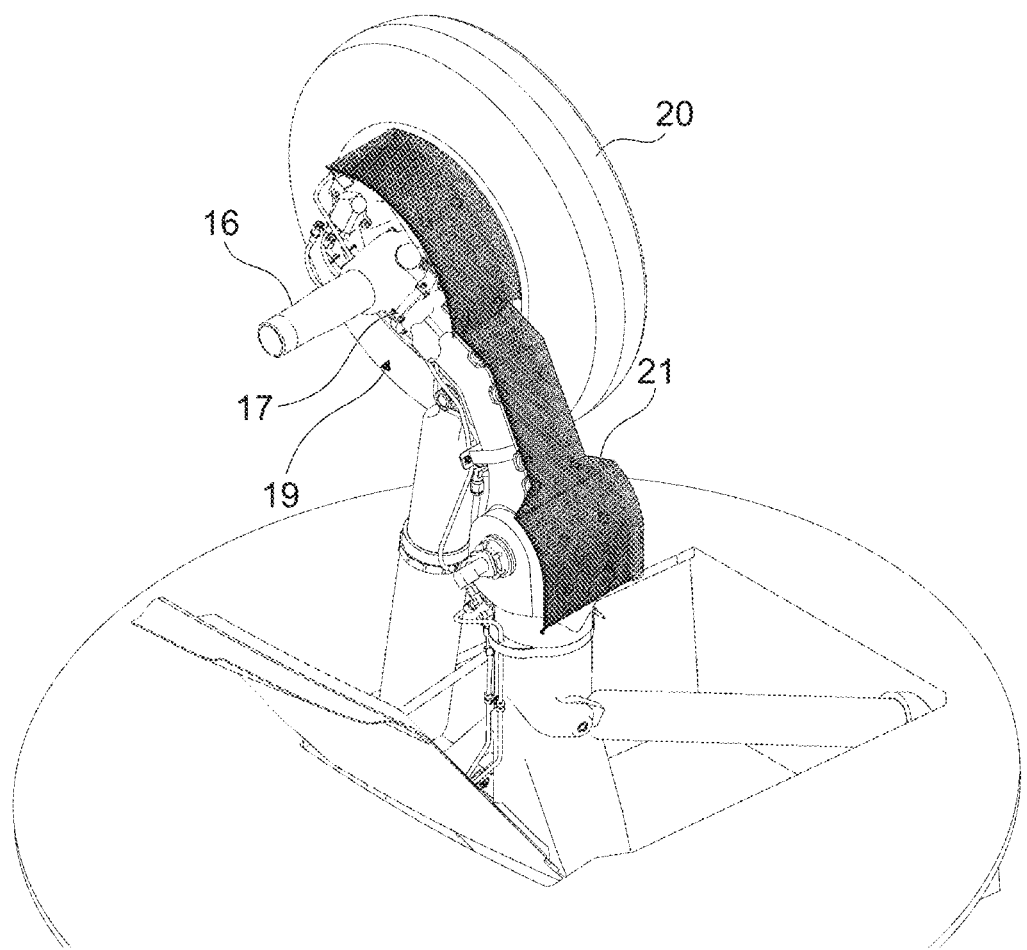
FIG. 8 A perspective view showing a configuration in which a porous plate is disposed in the main landing gear inter-wheel section.
Figure 9:
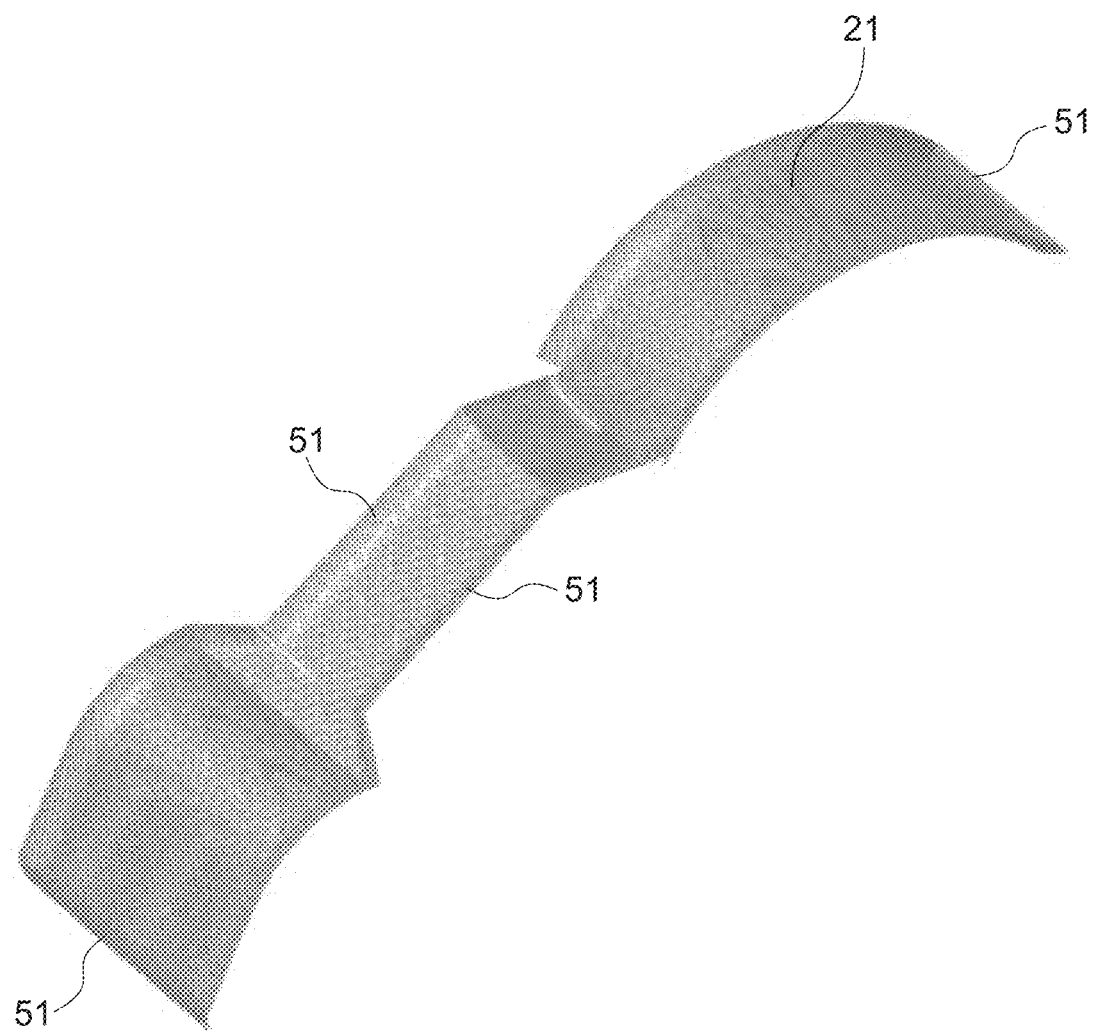
FIG. 9 A perspective view showing the porous plate shown in FIG. 8.
Figure 10:
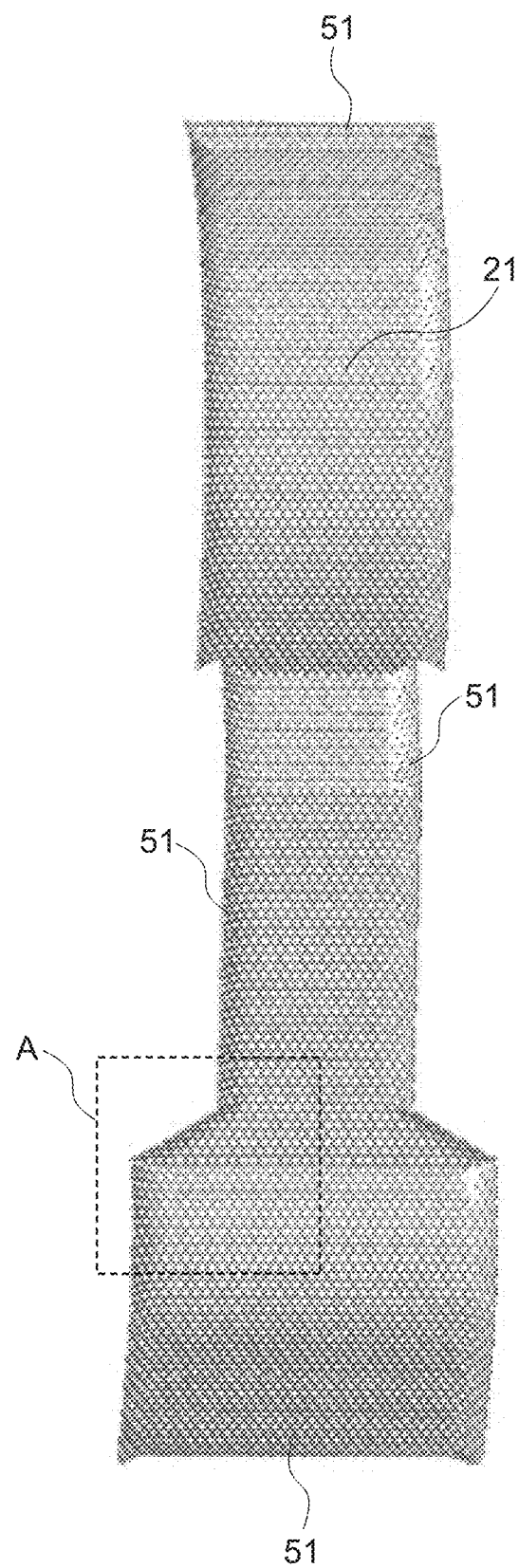
FIG. 10 A front view showing the porous plate shown in FIG. 8.
Figure 11:
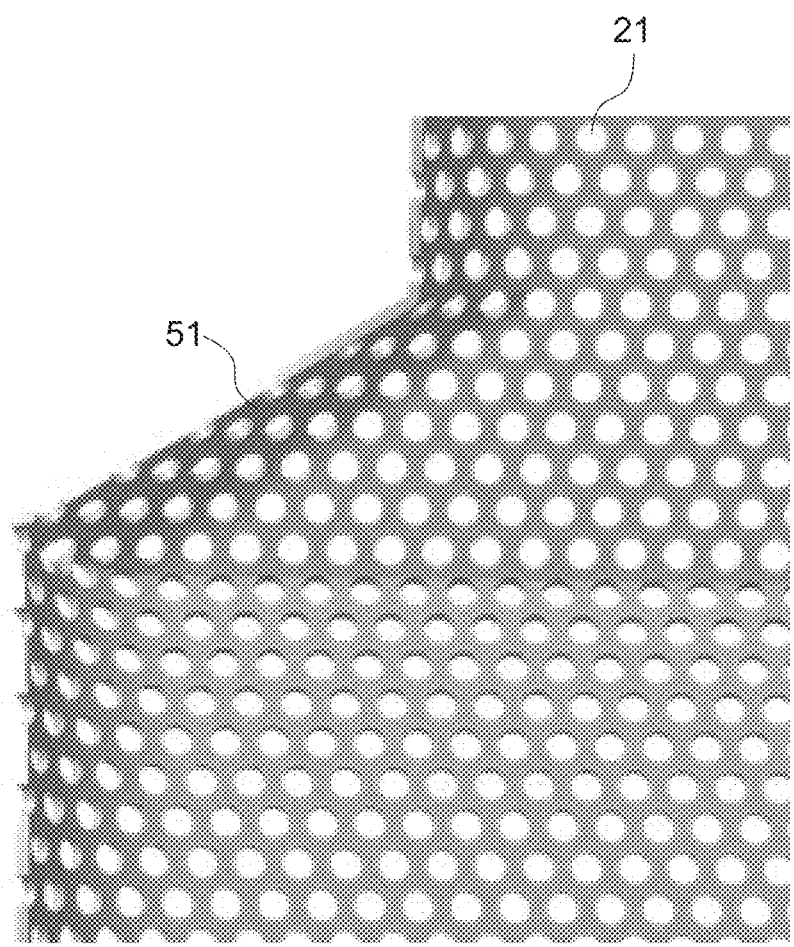
FIG. 11 A partially enlarged view of FIG. 10.

FIG. 8 is a perspective view showing a configuration in which the porous plate 21 is disposed in the main landing gear inter-wheel sections 19. FIG. 9 is a perspective view of the porous plate 21, FIG. 10 is a front view showing the porous plate 21, and FIG. 11 is a partially enlarged view of FIG. 10.

The porous plate 21 has a shape to cover the front side of the main landing gear inter-wheel section 19, and is disposed with a predetermined interval from the main landing gear inter-wheel section 19. The porous plate 21 is made of, for example, a punching metal. The porous plate 21 is disposed so as to slightly incline from a direction perpendicular to the flight direction of the aircraft 10.

The porous plate 21 is bent toward the flight direction side of the aircraft 10 and has the bend regions 51 having a concave R-shape on the flight direction side over the entire circumference of the end portion. The bend regions 51 are formed, for example, by bending the end portions of the porous plate 21 forward. Here, the bend regions 51 having an R shape is rounded forward at the end portions where R=25 mm.

Figure 12:
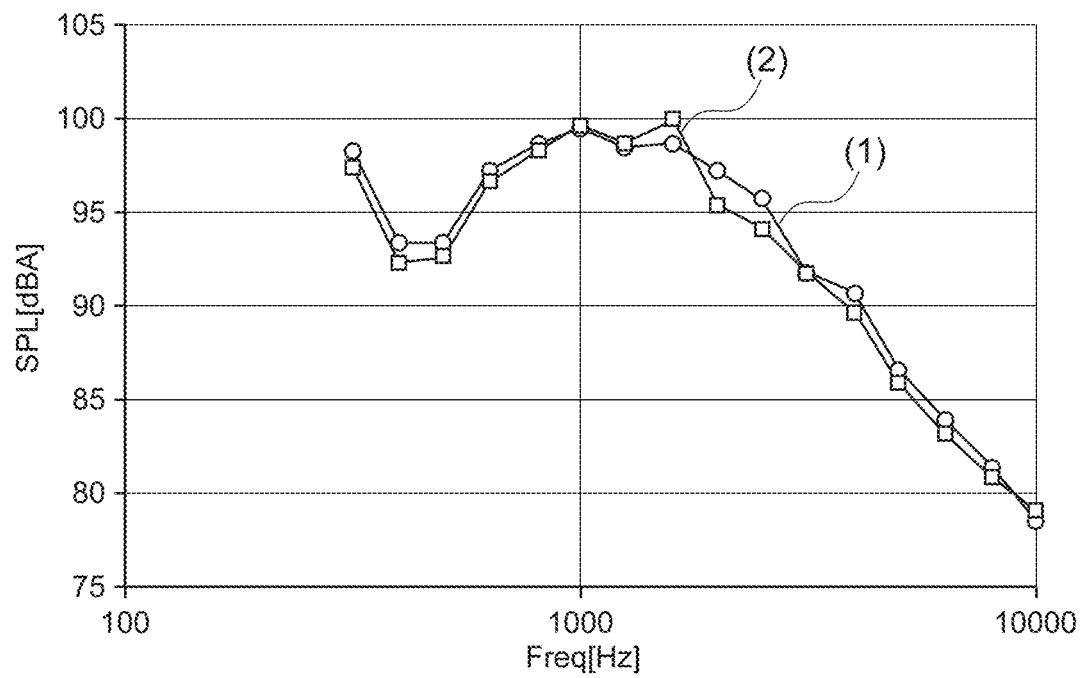
FIG. 12 Numerical analysis results of the frequency distribution of the noise when the noise reduction apparatus shown in FIG. 8 is applied.
Figure 13:
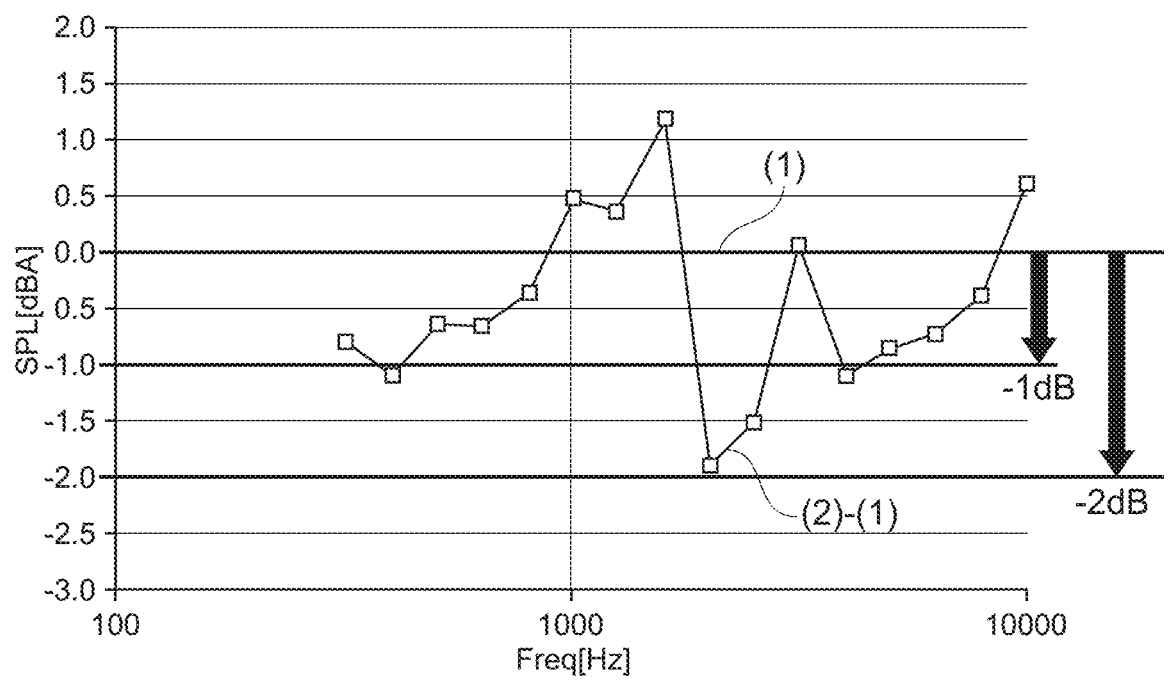
FIG. 13 A graph showing the difference between the results of FIG. 12.

The simulation results performed to confirm the noise reduction effect of the porous plate 21 according to the present embodiment are shown. FIGS. 12 and 13 are numerical analysis evaluation results.

FIG. 12 shows the frequency distribution of noise. FIG. 12 shows the case where a flat porous plate is disposed (1), and the case where the porous plate 21 (porous plate according to the present embodiment) bent forward at the end portions is disposed (2). FIG. 13 shows these differences. It is understood that the noise level of the porous plate 21 according to the present embodiment is lower over a wide band as compared with the flat porous plate.

Therefore, the porous plate 21 according to the present embodiment may increase the amount of noise reduction in the main landing gear inter-wheel section 19.

Figure 14:
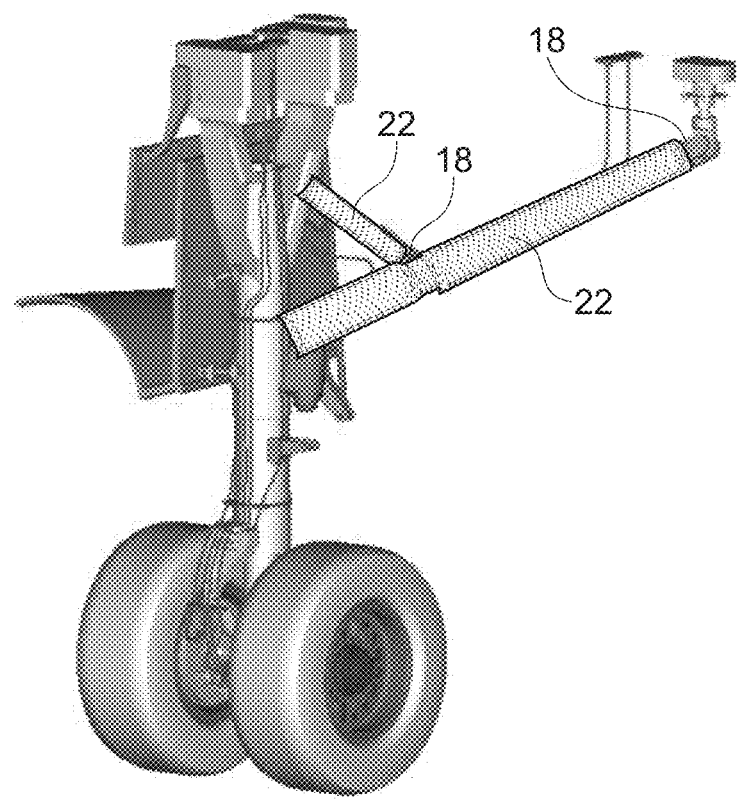
FIG. 14 A front view showing a configuration in which a porous plate is disposed for a side brace.
Figure 15:
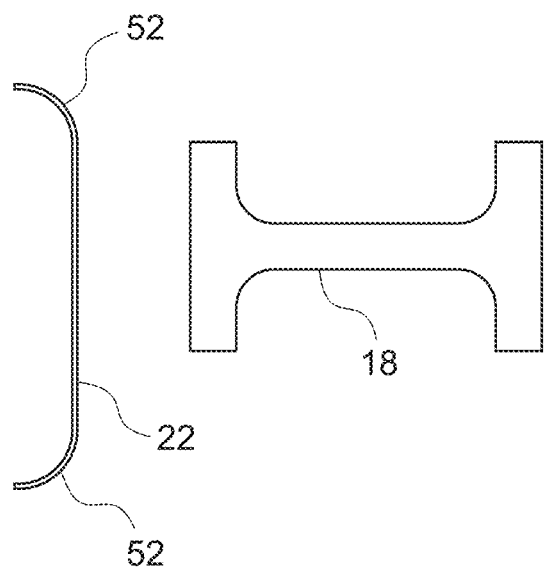
FIG. 15 A cross-sectional view of a porous plate and a side brace shown in FIG. 14.

FIG. 14 is a front view showing a configuration in which the porous plate 22 is disposed for the side brace 18. FIG. 15 is a cross-sectional view of the porous plate 22 and the side brace 18.

The porous plate 22 has a shape to cover the front side of the side brace 18, and is disposed at a predetermined distance from the side brace 18. The porous plate 22 is made of, for example, a punching metal. The porous plate 22 is disposed at a predetermined angle with respect to the flight direction of the aircraft 10. The arrangement of the porous plate 22 is also included in "disposed to face the fluid flow".

The porous plate 22 has the bend regions 52 with a concave R-shape on the direction of flight side over the entire circumference of the end portion. The bend regions 52 are formed, for example, by bending the end portions of the porous plate 22 forward.

Figure 16:
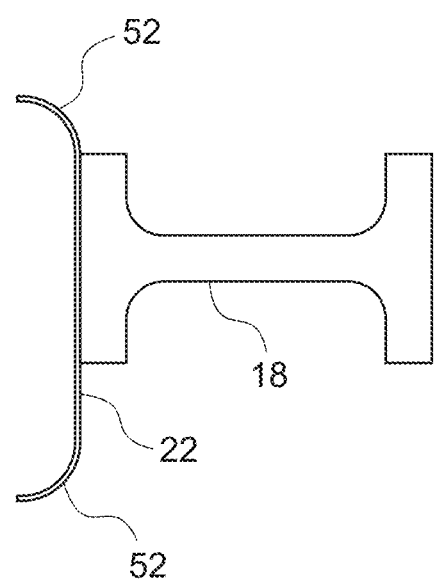
FIG. 16 A front view showing another configuration in which the porous plate is disposed for the side brace.

As shown in FIG. 16, the porous plate 22 may be disposed so as to be in contact with the front side of the side brace 18.

The simulation results performed to confirm the noise reduction effect of the porous plate 22 according to the present embodiment are shown. FIGS. 17A-17E, 18, 19, 20, 29, and 30 are numerical analysis evaluation results.

Figure 17A:
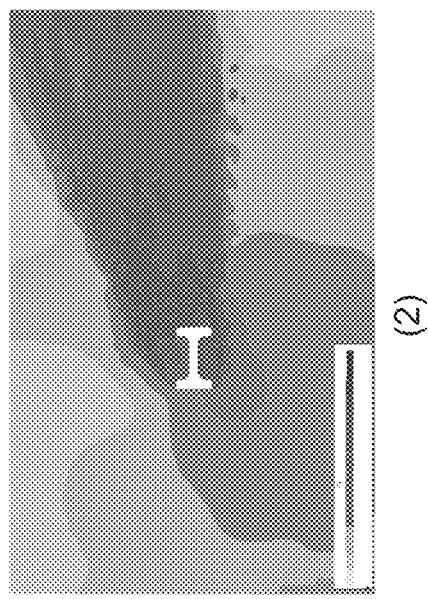
FIG. 17A Numerical analysis results of the cross-sectional flow velocity distribution, the in-plane streamline, and the cross-sectional pressure fluctuation distribution when the side brace is disposed as it is in the fluid flow.
Figure 17A:
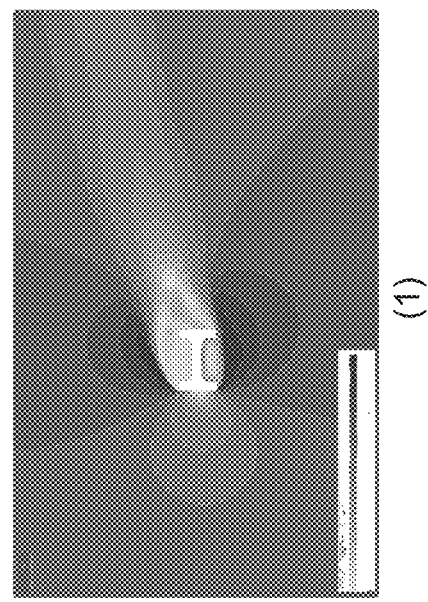
Figure 17A:
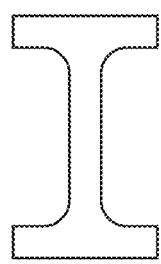

FIG. 17A shows the cross-sectional flow velocity distribution and the in-plane streamline (FIG. 17A (1)) and the cross-sectional pressure fluctuation distribution (891 Hz to 1122 Hz) (FIG. 17A (2)) when the side brace 18 is disposed as it is in the fluid flow in which the flow is flowing at an angle of 12.5 degrees from the lower left to the upper right in the drawing.

Figure 17B:
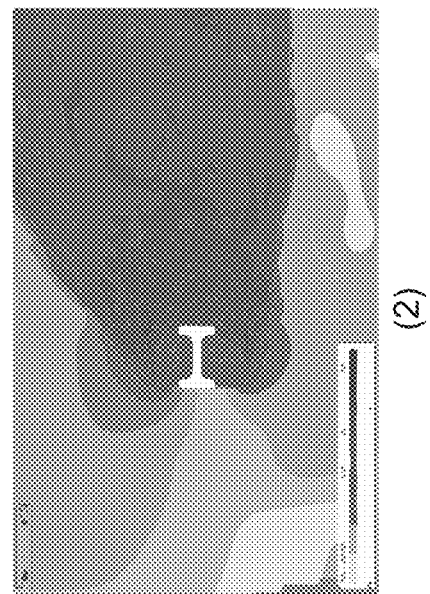
FIG. 17B Numerical analysis results of the cross-sectional flow velocity distribution, the in-plane streamline, and the cross-sectional pressure fluctuation distribution when a flat plate is disposed in front of the side brace.
Figure 17B:
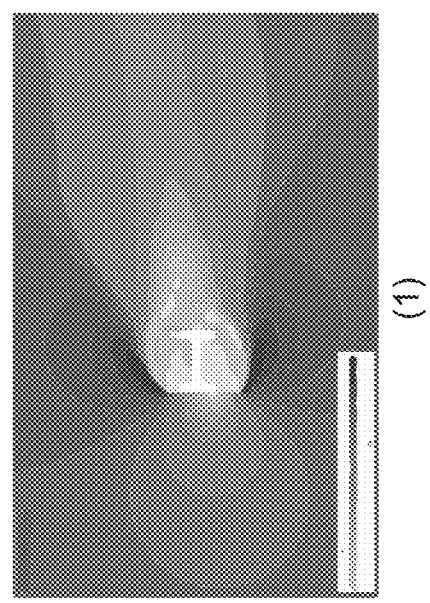
Figure 17B:
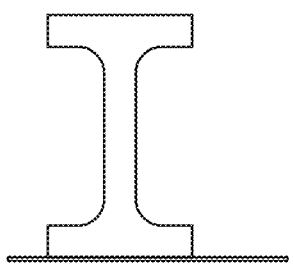

FIG. 17B shows the cross-sectional flow velocity distribution and the in-plane streamline (FIG. 17B (1)) and the cross-sectional pressure fluctuation distribution (891 Hz to 1122 Hz) (FIG. 17B (2)) when a flat plate is disposed in contact with the front side of the side brace 18.

Figure 17C:
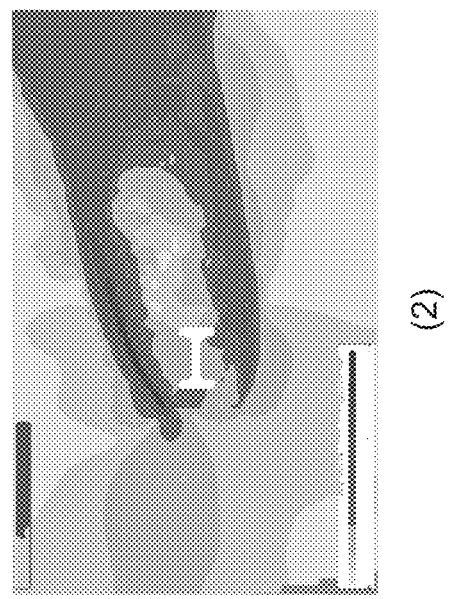
FIG. 17C Numerical analysis results of the cross-sectional flow velocity distribution, the in-plane streamline, and the cross-sectional pressure fluctuation distribution when a flat porous plate is disposed in front of the side brace.
Figure 17C:
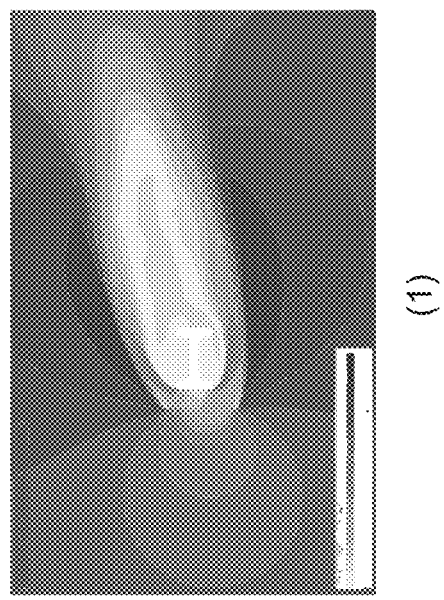
Figure 17C:
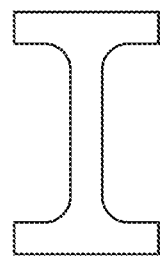

FIG. 17C shows the cross-sectional flow velocity distribution and the in-plane streamline (FIG. 17C (1)) and the cross-sectional pressure fluctuation distribution (891 Hz to 1122 Hz) (FIG. 17C (2)) when a flat porous plate is disposed in front of the side brace 18.

Figure 17D:
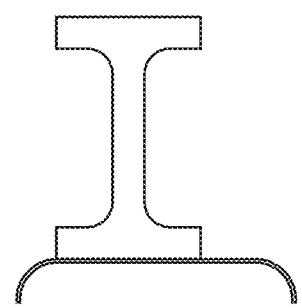
FIG. 17D Numerical analysis results of the cross-sectional flow velocity distribution, the in-plane streamline, and the cross-sectional pressure fluctuation distribution when a porous plate bent forward at the end portions is disposed in front of the side brace.
Figure 17D:
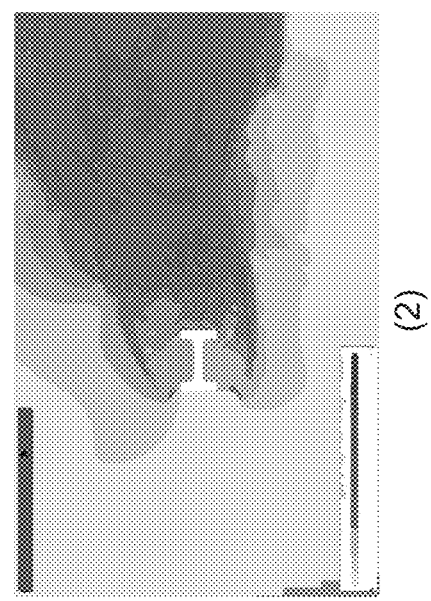
Figure 17D:
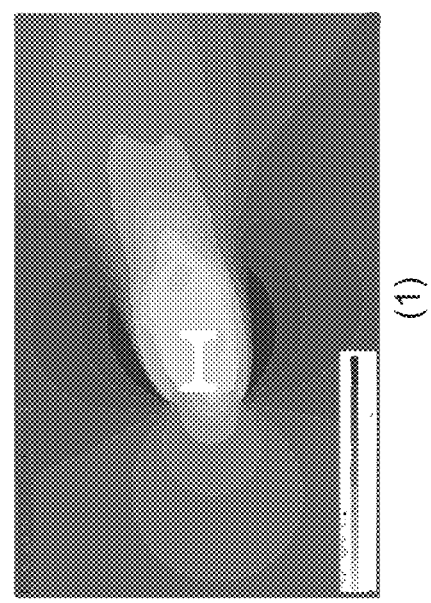

FIG. 17D shows the cross-sectional flow velocity distribution and the in-plane streamline (FIG. 17D (1)) and the cross-sectional pressure fluctuation distribution (891 Hz to 1122 Hz) (FIG. 17D (2)) in the case where the flat porous plate (the porous plate 22 according to the present embodiment) bent forward at the end portions is disposed in front of and in contact with the side brace 18, that is, in the case where the porous end portions of the flat plate are bent forward in FIG. 17B.

Figure 17E:
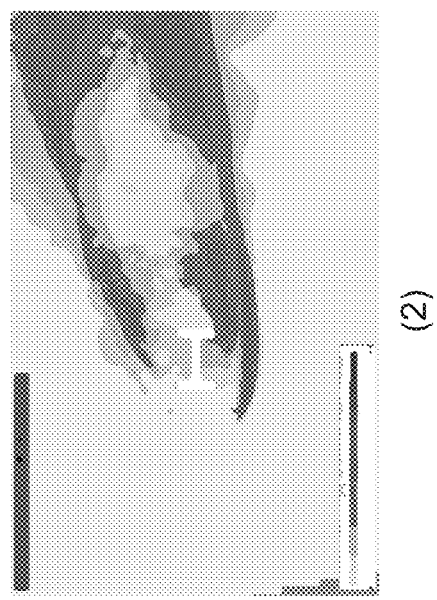
FIG. 17E Numerical analysis results of the cross-sectional flow velocity distribution, the in-plane streamline, and the cross-sectional pressure fluctuation distribution when a porous plate bent forward at the end portions is disposed in front of the side brace spaced apart.
Figure 17E:
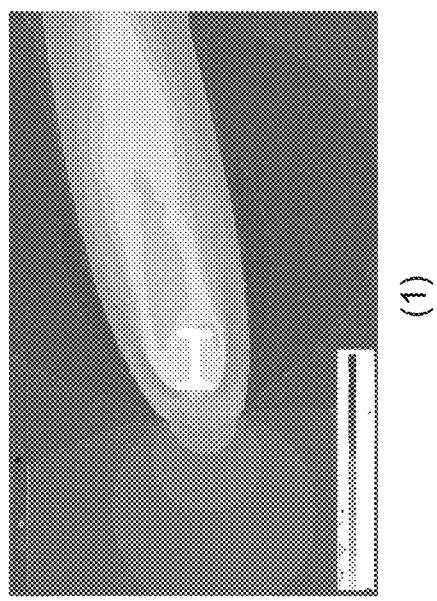
Figure 17E:
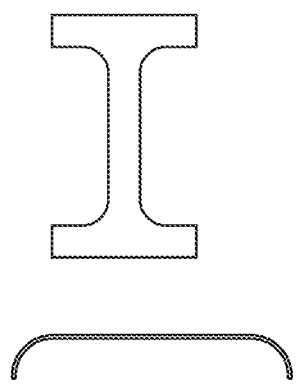

FIG. 17E shows the cross-sectional flow velocity distribution and the in-plane streamline (FIG. 17E (1)) and the cross-sectional pressure fluctuation distribution (891 Hz to 1122 Hz) (FIG. 17E (2)) in a case in which a porous plate (porous plate 22 according to the present embodiment) bent forward at the end portions is disposed in front of the side brace 18 spaced apart, that is, the end portions of the flat porous plate are bent forward in FIG. 17C.

Compared to the case where the flat plate is not present in front or the flat plate is in contact as shown in FIGS. 17A (1) and 17B (1), the flow velocity around the side brace 18 is slowed by the presence of the porous plate in front as shown in FIG. 17C (1), 17D (1), and FIG. 17E (1).

Comparing FIG. 17B (1), FIG. 17D (1), FIG. 17C (1), and FIG. 17E (1), the velocity difference behind the end portions of the porous plate is reduced by the porous plate (porous plate 22 according to the present embodiment) bent forward at the end portions disposed in front, and the shear layer is weakened. Comparing FIG. 17B (2), FIG. 17D (2), FIG. 17C (2), and FIG. 17E (2), it is understood that the use of the porous plate according to the present embodiment drastically reduces the region where the pressure fluctuation behind the end portion of the porous plate is large.

Figure 29:
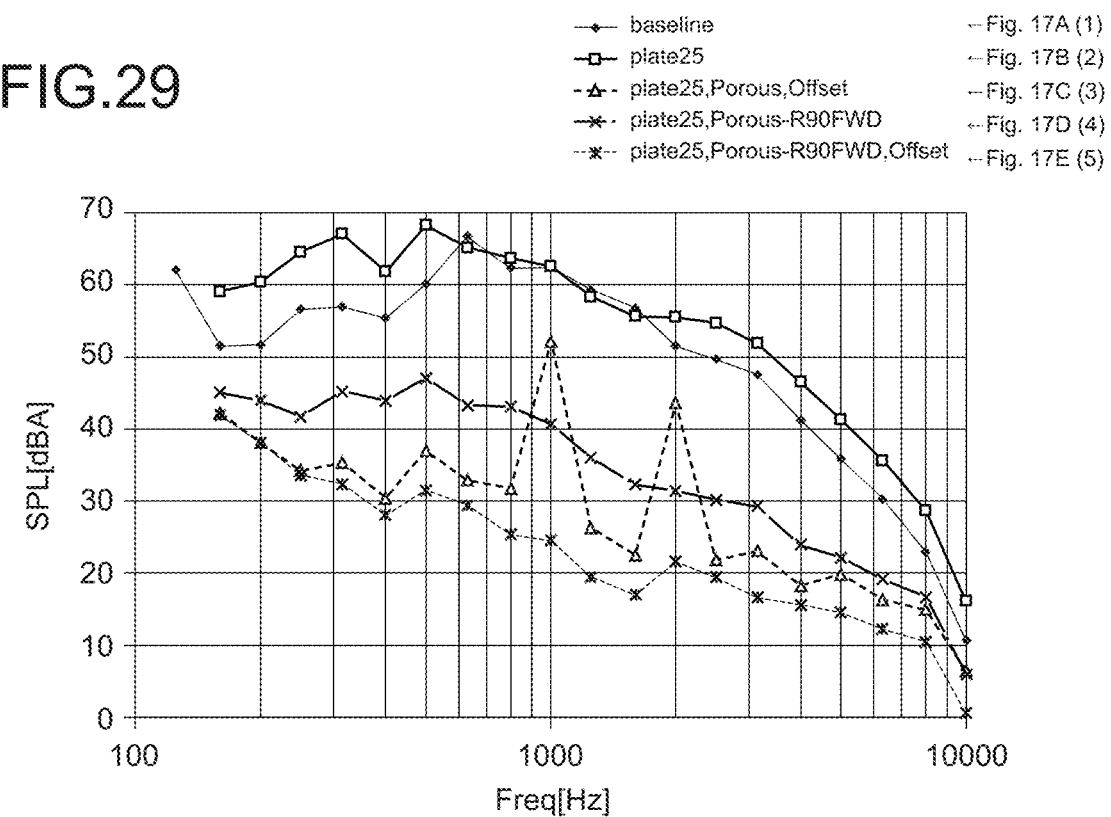
FIG. 29 A graph showing the results of FIGS. 17A-17E.
Figure 30:
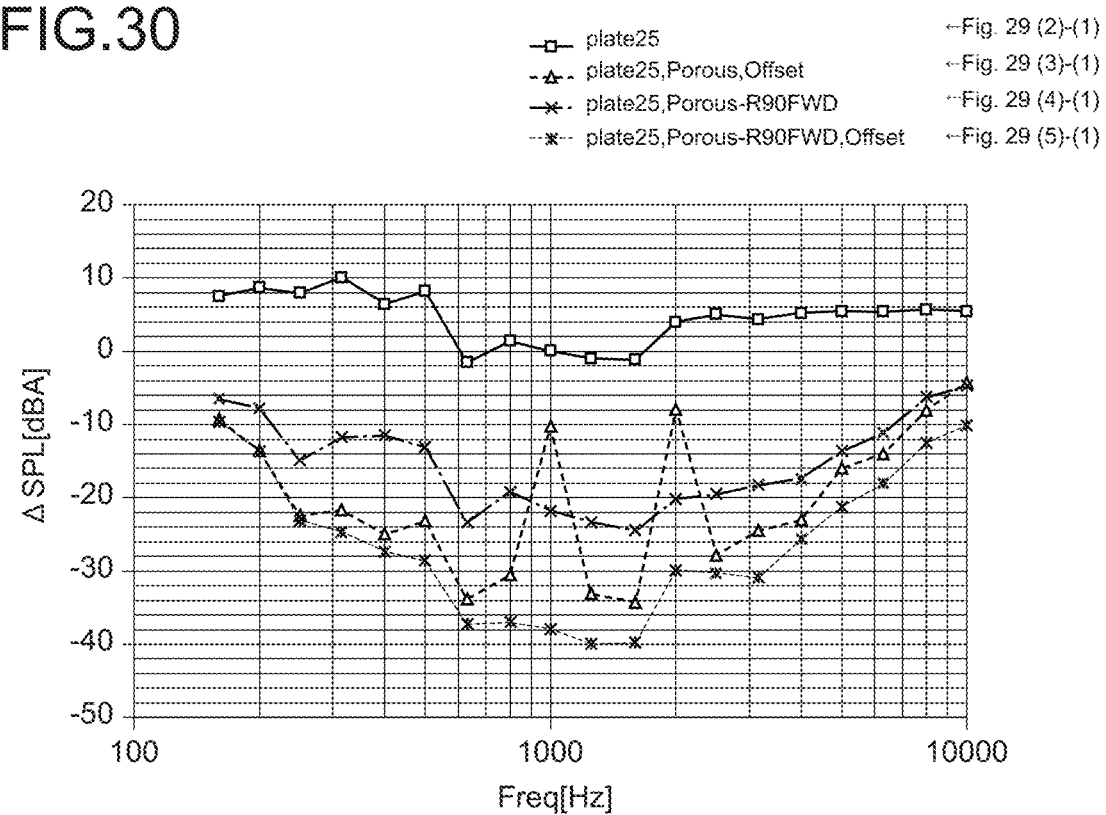
FIG. 30 A graph showing the difference in the results of FIGS. 17A-17E.

FIG. 29 shows the frequency distribution of noise. FIG. 29 shows the frequency distribution of noise of each of FIG. 17A (1), FIG. 17B (2), FIG. 17C (3), FIG. 17D (4), and FIG. 17E (5). FIG. 30 shows these differences, namely (2)-(1), (3)-(1), (4)-(1), and (5)-(1) of FIG. 29. From these results, it is understood that, by using the porous plate 22 according to the present embodiment, the noise level is lower over a wide band.

Figure 18:
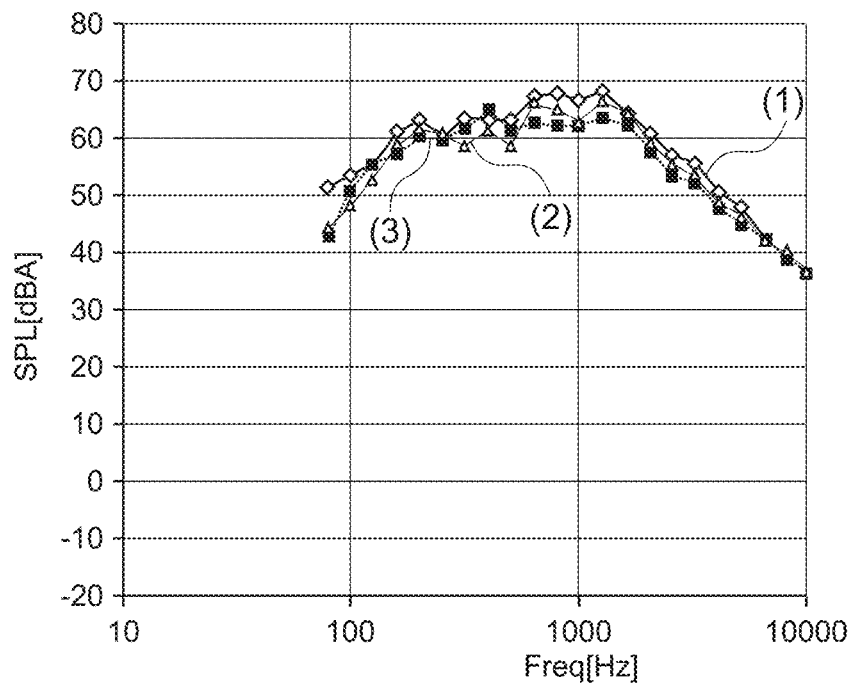
FIG. 18 Numerical analysis results of the frequency distribution of the noise when the noise reduction apparatus shown in FIG. 14 is applied.
Figure 19:
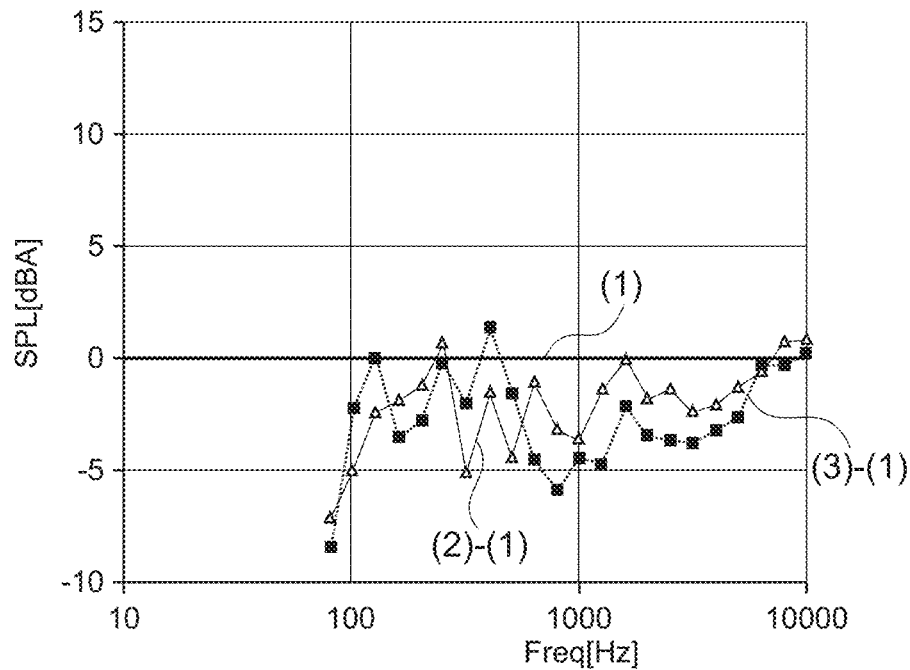
FIG. 19 A graph showing the difference between the results of FIG. 18.

FIG. 18 shows the frequency distribution of the noise of the three-dimensional numerical analysis result using the three-dimensional shape of the side brace and the landing gear bay portion of the form shown in FIG. 14. FIG. 18 shows the case where the side brace 18 is disposed as it is in the fluid flow (1), the case where the porous plate (porous plate 22 according to the present embodiment) bent forward at the end portions is disposed in front of and in contact with the side brace 18 (2), and the case where the porous plate (porous plate 22 according to the present embodiment) bent forward at the end portions is disposed in front of the side brace 18 spaced apart (3). FIG. 19 shows these differences, namely (2)-(1) in FIG. 18 and (3)-(1) in FIG. 18. From these results, it is understood that the noise level is low over a wide band when the porous plate 22 according to the present embodiment is used.

Figure 20:
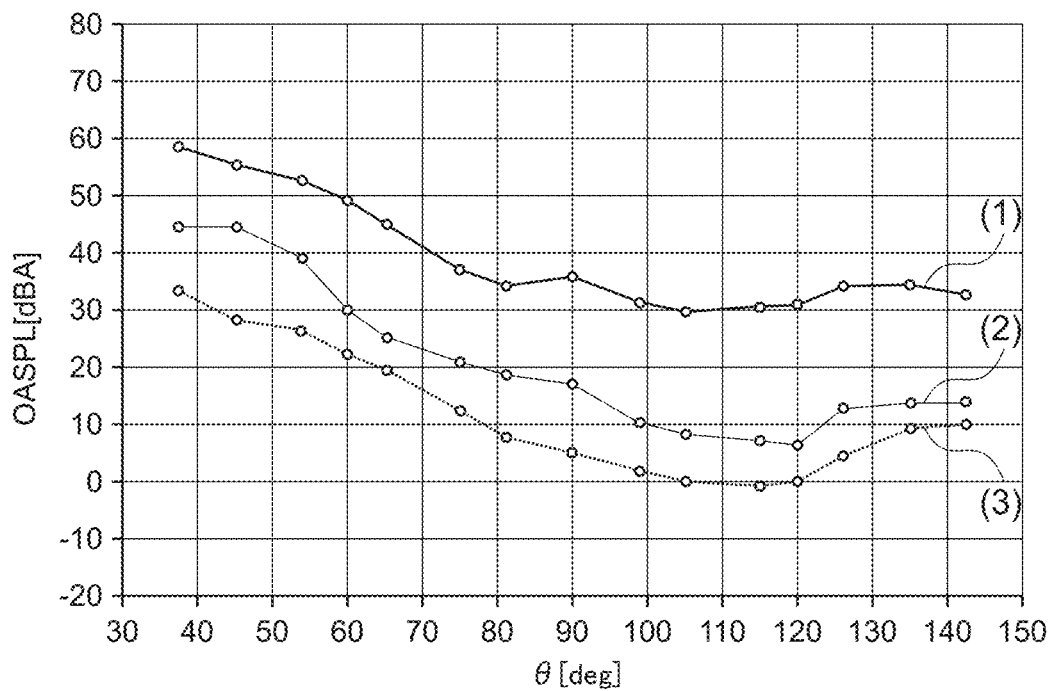
FIG. 20 Numerical analysis results of the noise level around the side brace.

FIG. 20 shows the noise level (OASPL) synthesized by adding the A-weighted audibility compensation around the side brace 18 to the sum of the levels for each frequency band from 38 Hz to 10.7 kHz. The angle in the graph shows the angle formed with the fluid flow. FIG. 20 shows the case where the side brace 18 is disposed as it is in the fluid flow (1), the case where the porous plate (porous plate 22 according to the present embodiment) bent forward at the end portions is disposed in front of and in contact with the side brace 18 (2), and the case where the porous plate (porous plate 22 according to the present embodiment) bent forward at the end portions is disposed in front of the side brace 18 spaced apart (3). From these results, it is understood that the noise level is low all the directions when the porous plate 22 according to the present embodiment is disposed.

From the above results, it is understood that the amount of noise reduction around the side brace 18 may be increased by the porous plate 22 according to the present embodiment.

Figure 21A:
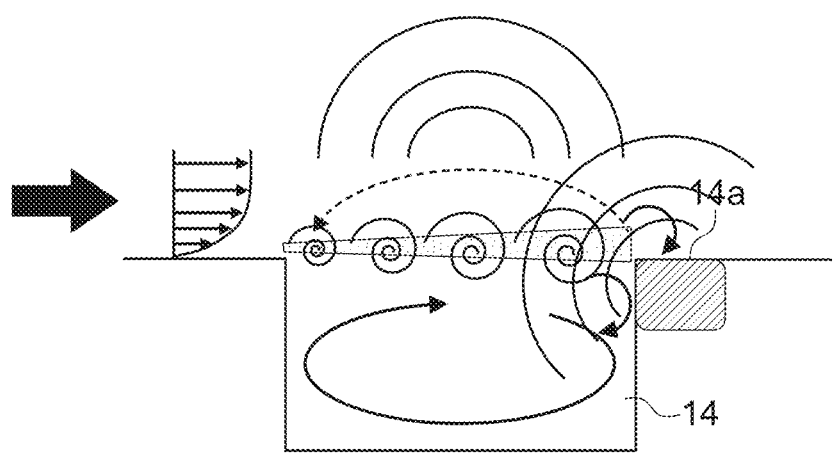
FIG. 21A A first diagram for explaining a cause of noise generated in a landing gear bay.
Figure 21B:
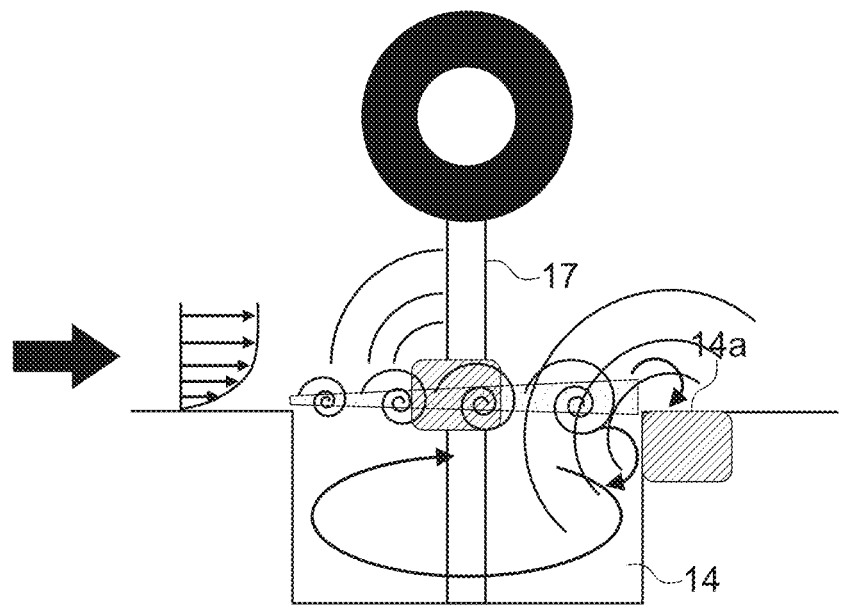
FIG. 21B A second diagram for explaining a cause of noise generated in the landing gear bay.

FIGS. 21A and 21B are diagrams for explaining the cause of the noise generated in the landing gear bay 14.

As shown in FIG. 21A, when the airflow passes over the landing gear bay 14, a strong shear layer is generated by the velocity difference (pressure difference) with the air in the landing gear bay 14, the vortex is generated, and the vortex grows gradually. The grown vortex continuously hits the region 14a of the trailing edge of the landing gear bay 14, for example, the pressure fluctuation is propagated upstream to form a feedback loop inducing vibration of the vortex, and the narrow band sound is generated. Further, since the grown vortex continuously hits the region 14a of the trailing edge, the pressure fluctuation is increased, and the noise is generated therefrom. Further, as shown in FIG. 21B, a vortex hits the landing gear strut 17 of the landing gear bay 14, and the noise is generated therefrom.

Figure 22:
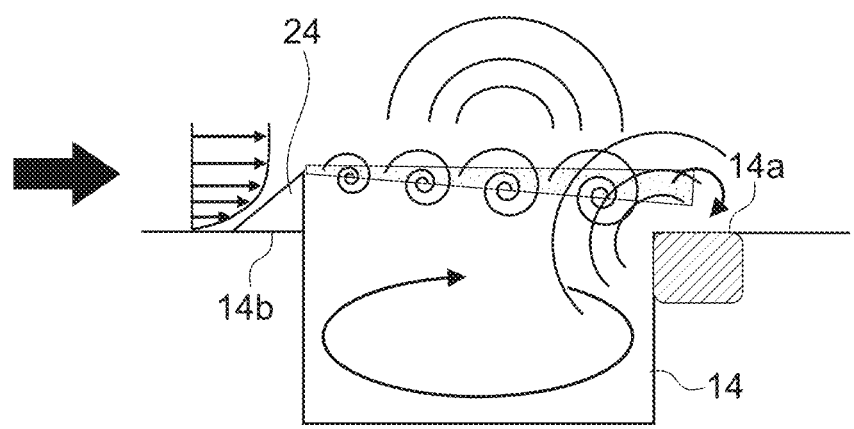
FIG. 22 A diagram showing an example in which a deflector is disposed along the front edge of the landing gear bay.

FIG. 22 is a diagram showing an example in which the deflector 24 is disposed along the front edge 14b of the landing gear bay 14. The deflector 24 is a member having a slope that gradually increases in height from the front toward the landing gear bay 14. By shifting the shear layer away from the cavity by disposing the deflector 24, the pressure fluctuation caused by the vortex that hits the region 14a of the trailing edge of the landing gear bay 14 is reduced, and the above-mentioned cavity noise is reduced. However, a strong shear layer is generated, a vortex is generated, and noise is generated from the landing gear strut 17 of FIG. 21B.

Figure 23:
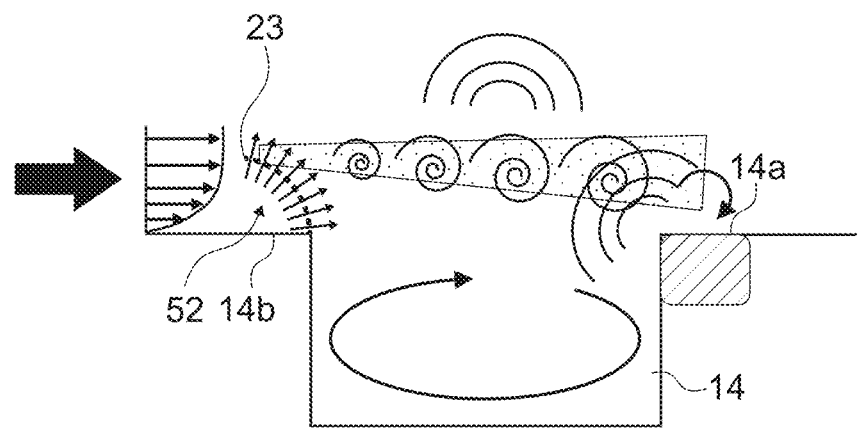
FIG. 23 A diagram showing an example in which a porous plate is disposed along the front edge of the landing gear bay.
Figure 24:
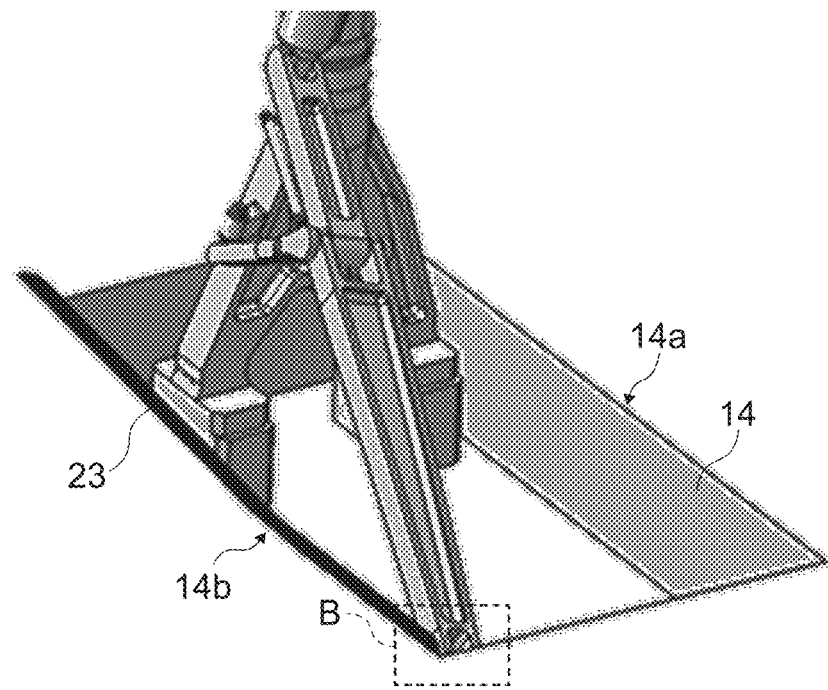
FIG. 24 A perspective view of FIG. 23.
Figure 25:
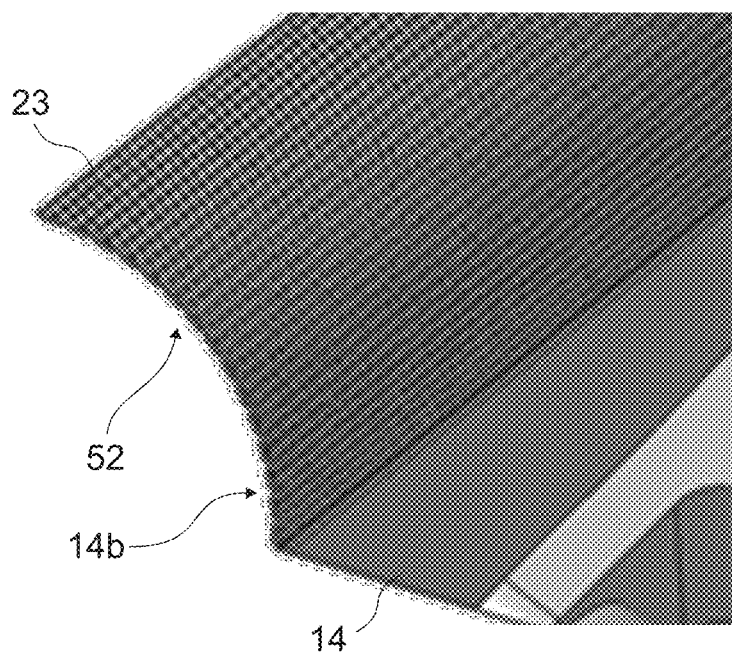
FIG. 25 A partially enlarged perspective view of the porous plate shown in FIG. 24.

FIG. 23 is a diagram showing an example in which the porous plate 23 according to the present embodiment is disposed along the front edge 14b of the landing gear bay 14. FIG. 24 is a perspective view thereof, and FIG. 25 is a partially enlarged perspective view of the porous plate 23.

The porous plate 23 has an elongated shape along the front edge 14b of the landing gear bay 14. The porous plate 23 is made of, for example, a punching metal.

The porous plate 23 has a bend region having a concave R shape toward the flight direction side. The bend region 52 is formed, for example, by bending the porous plate 23 forward.

Although the direction of the fluid flow is deflected upward from the bottom of the porous plate 23 of FIG. 23 due to the porous plate 23 present in the airflow, the deflected air easily passes through the porous plate 23 since the porous plate 23 has the bend region 52. This reduces the velocity difference between the air "A" passing through the bend region 52 and the air "B" outside the end thereof, and weakens the shear layer itself of the fluid flow between those airs and the fluctuation of the shear layer, which weakens the vortex generated by the shear layer or eliminates the generation of vortex. Also, it is possible to shift the shear layer away from the cavity by the upward deflection similar to the deflector 24. Therefore the pressure fluctuation in the region 14a of the trailing edge of the landing gear bay 14 is reduced, and the noise generated therefrom is reduced. The noise generated from the landing gear strut 17 of FIG. 21B is also reduced.

FIGS. 26A-26C, 27, and 28 show the simulation results performed to confirm the noise reduction effect of the porous plate 23 according to the present embodiment. FIGS. 26A-26C, 27, and 28 are numerical analysis evaluation results.

Figure 26A:
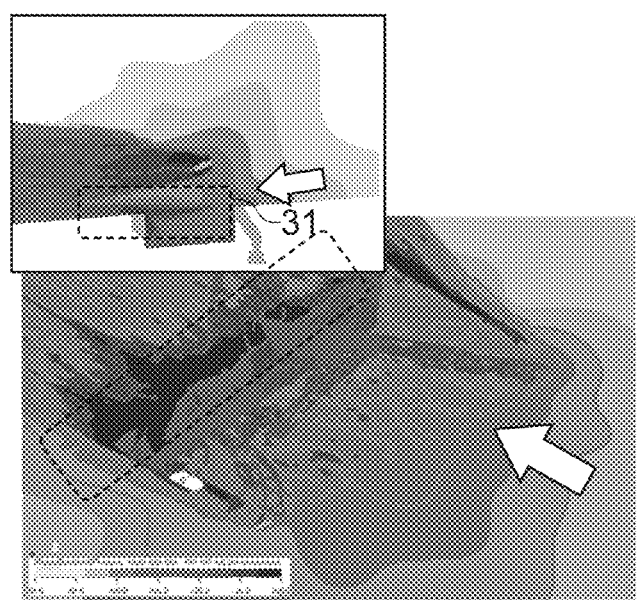
FIG. 26A A numerical analysis result of the cross-sectional pressure fluctuation distribution in the case where a deflector or a porous plate is not disposed at the leading edge of the landing gear bay.

FIG. 26A shows the cross-sectional pressure fluctuation distribution in the case of not disposing the deflector 24 and the porous plate 23.

Figure 26B:
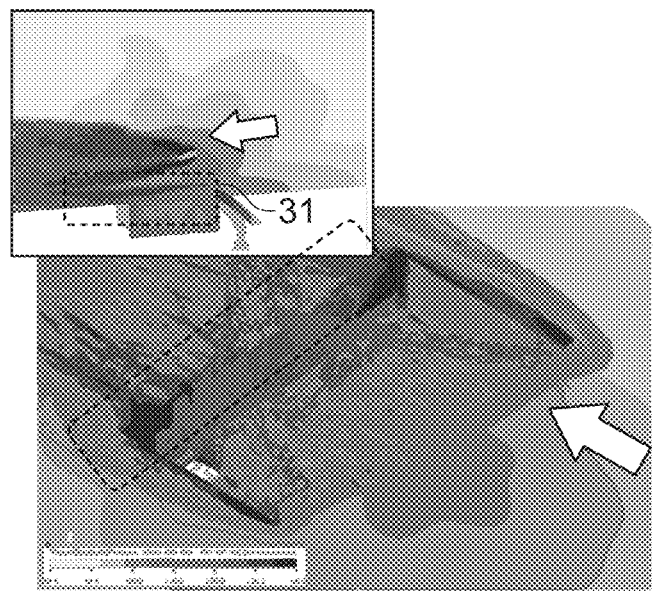
FIG. 26B A numerical analysis result of the cross-sectional pressure fluctuation distribution in the case where a deflector is disposed at the leading edge of the landing gear bay.

FIG. 26B shows the cross-sectional pressure fluctuation distribution in the case of disposing the deflector 24.

Figure 26C:
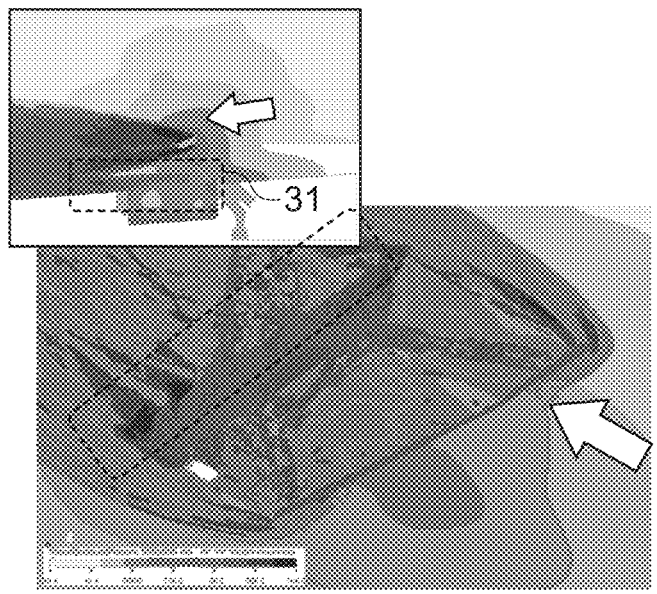
FIG. 26C A numerical analysis result of the cross-sectional pressure fluctuation distribution in the case where a porous plate is disposed at the leading edge of the landing gear bay.

FIG. 26C shows a cross-sectional pressure fluctuation distribution when the porous plate 23 according to the present embodiment is disposed.

In FIGS. 26A-26C, when comparing the regions indicated by the reference numeral 31, it is understood that the pressure fluctuation is the smallest when the porous plate 23 according to the present embodiment is disposed.

Figure 27:
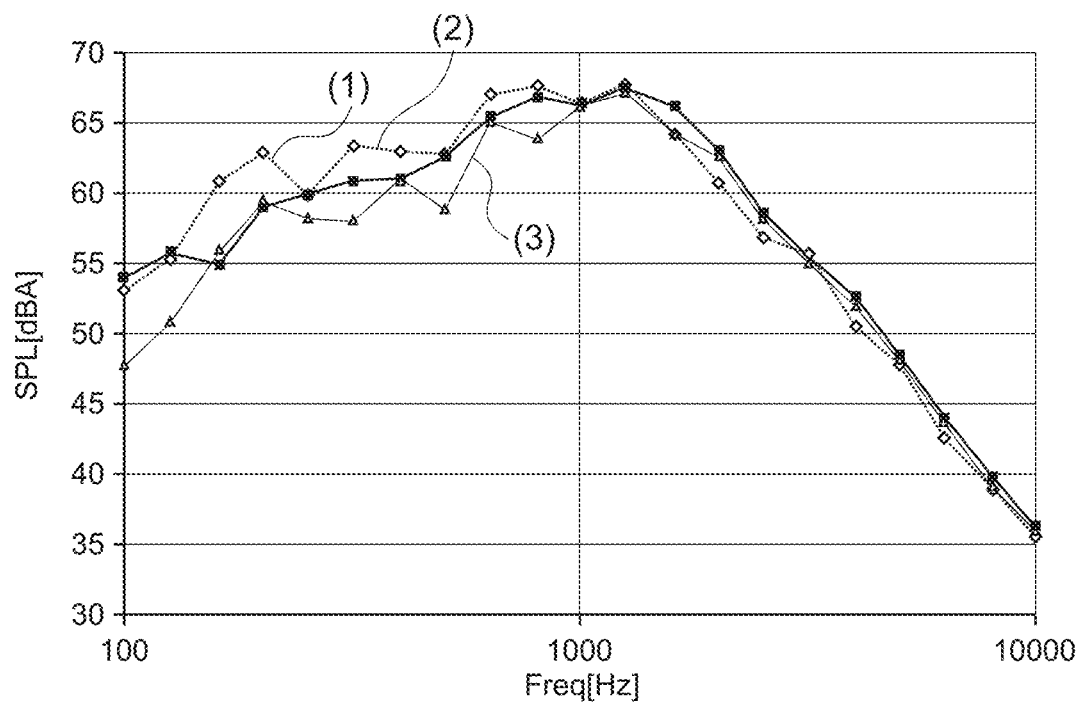
FIG. 27 Numerical analysis results of the frequency distribution of noise when the noise reduction apparatus shown in FIG. 23 is applied.
Figure 28:
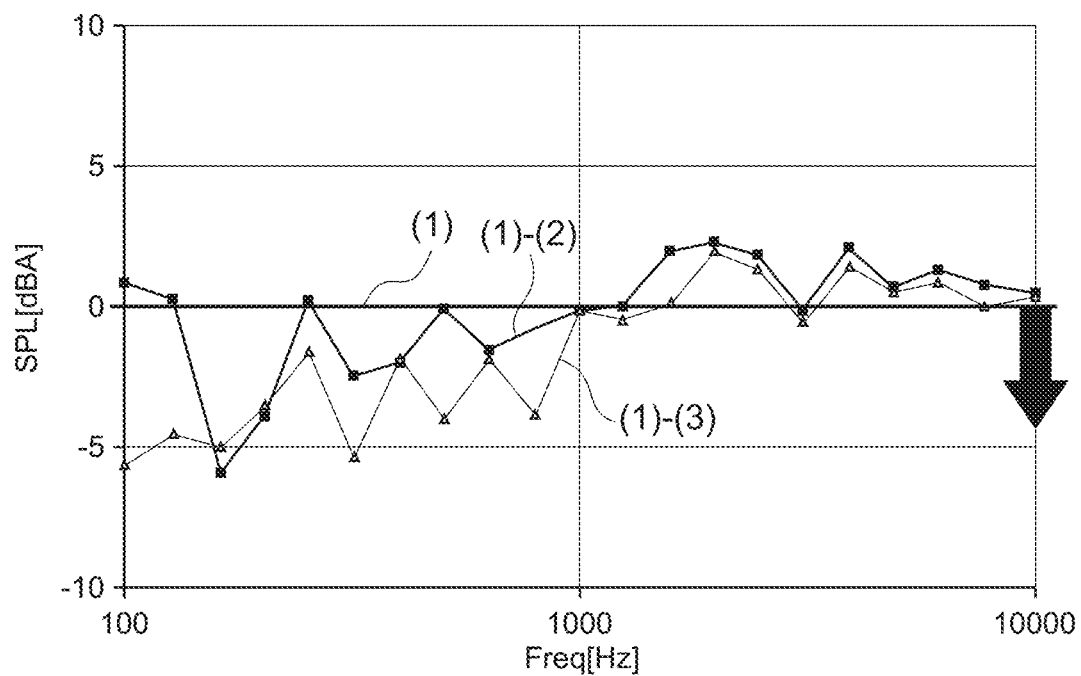
FIG. 28 A graph showing the difference between the results of FIG. 27.

FIG. 27 shows the frequency distribution of noise. FIG. 27 shows the case in which the deflector 24 and the porous plate 23 are not disposed (1), the case in which the deflector 24 is disposed (2), and the case in which the porous plate 23 according to the present embodiment is disposed (3). FIG. 28 shows these differences, namely (1)-(2) in FIG. 27 and (1)-(3) in FIG. 27. From these results, it is understood that the noise level is low over a wide band by using the porous plate 23 according to the present embodiment.

The present invention is not limited to the above embodiments, and the application to various fields is considered, and the scope of the application also belongs to the technical scope of the present invention.

In one of the above embodiments, the porous plate according to the present invention is disposed for the side brace of the main landing gear of the aircraft, but the porous plate according to the present invention may be disposed for the side brace of another landing gear as well as the main landing gear. In addition, the porous plate according to the present invention may be disposed not only on the side brace but also on the landing gear including the main landing gear.

Although the present invention is applicable to various parts of an aircraft, it is applicable to various fields such as automobiles, buildings, wind power generation facilities, or the like.

REFERENCE SIGNS LIST

1: noise reduction apparatus
2: porous plate

3: object
4: direction
5: bend region
6: end portion
10: aircraft
13: main landing gear
14: landing gear bay
14a: region
14b: front edge
15: main landing gear inter-wheel section
18: side brace
19: main landing gear inter-wheel section
21: porous plate
22: porous plate
23: porous plate
51: bend region
52: bend region

The invention claimed is:

1. A noise reduction apparatus reducing a noise generated by a fluid flow flowing from an upstream side of an object to a downstream side of the object, the noise reduction apparatus comprising:
a porous plate disposed at the upstream side, the porous plate facing the object, and the porous plate including a flat region and a bend region bent toward the upstream side,
wherein the bend region is formed by bending an end portion of the porous plate toward the upstream side,
wherein the end portion of the porous plate comprises a plurality of pores located at the upstream side and facing in a direction toward an outside of the object, and
wherein the porous plate decreases a velocity of the fluid flow at the downstream side, thereby reducing the noise generated by the fluid flow.

2. The noise reduction apparatus according to claim 1, wherein the bend region has a concave shape on the upstream side.

3. The noise reduction apparatus according to claim 1, wherein the porous plate is disposed to cover a front side of a main landing gear inter-wheel section of an aircraft.

4. The noise reduction apparatus according to claim 1, wherein the porous plate is disposed to cover a front side of a structural member of a landing gear of an aircraft.

5. The noise reduction apparatus according to claim 1, wherein the porous plate is disposed along a front edge of a landing gear bay of an aircraft, and the bend region is provided on a distal end side.

6. The noise reduction apparatus according to claim 1, wherein a width of the flat region is larger than a largest width of the object.

7. An aircraft, comprising:
a porous plate disposed to cover an object of the aircraft or to be disposed along the object of the aircraft, wherein the object is a front side of a main landing gear inter-wheel section, a front side of a structural member of a landing gear, or a front edge of a landing gear bay,
wherein the porous plate reduces a noise generated by a fluid flow flowing from an upstream side of the object to a downstream side of the object,
wherein the porous plate faces the object,
wherein the porous plate includes a flat region and a bend region bent toward the upstream side,
wherein the bend region is formed by bending an end portion of the porous plate toward the upstream side,
wherein the end portion of the porous plate comprises a plurality of pores located at the upstream side and facing in a direction toward an outside of the object, and
wherein the porous plate decreases a velocity of the fluid flow at the downstream side, thereby reducing the noise generated by the fluid flow.

8. The aircraft according to claim 7, wherein a width of the flat region is larger than a largest width of the object.

9. A noise reduction method for reducing a noise generated by a fluid flow flowing from an upstream side of an object to a downstream side of the object, the method comprising:
disposing a porous plate on the upstream side of the object, the porous plate facing the object; and
bending an end portion of the porous plate toward the upstream side to give a bend region of the porous plate, the porous plate comprising a flat region and the bend region, and a direction of the fluid flow being deflected due to the porous plate,
wherein the end portion of the porous plate comprises a plurality of pores located at the upstream side and facing in a direction toward an outside of the object, and
wherein the porous plate decreases a velocity of the fluid flow at the downstream side, thereby reducing the noise generated by the fluid flow.

10. The noise reduction method according to claim 9, wherein a width of the flat region is larger than a largest width of the object.

* * * * *